(12) United States Patent
Sinnet et al.

(10) Patent No.: US 11,167,421 B2
(45) Date of Patent: Nov. 9, 2021

(54) ROBOTIC KITCHEN ASSISTANT INCLUDING UNIVERSAL UTENSIL GRIPPING ASSEMBLY

(71) Applicant: Miso Robotics, Inc., Pasadena, CA (US)

(72) Inventors: Ryan Sinnet, Pasadena, CA (US);
Robert Anderson, Pasadena, CA (US);
William Werst, Pasadena, CA (US)

(73) Assignee: Miso Robotics, Inc., Pasadena, CA (US)

( * ) Notice: Subject to any disclaimer, the term of this patent is extended or adjusted under 35 U.S.C. 154(b) by 106 days.

(21) Appl. No.: 16/534,207

(22) Filed: Aug. 7, 2019

(65) Prior Publication Data

US 2020/0047349 A1  Feb. 13, 2020

Related U.S. Application Data

(60) Provisional application No. 62/757,601, filed on Nov. 8, 2018, provisional application No. 62/717,725, filed on Aug. 10, 2018.

(51) Int. Cl.
*B25J 11/00* (2006.01)
*B25J 15/08* (2006.01)
(Continued)

(52) U.S. Cl.
CPC ............ *B25J 11/0045* (2013.01); *A23L 5/11* (2016.08); *A23L 13/50* (2016.08); *A23L 19/18* (2016.08);
(Continued)

(58) Field of Classification Search
CPC .... B25J 15/0033; B25J 15/0042; B25J 15/08; B25J 19/021; B25J 19/04; B25J 13/08;
(Continued)

(56) References Cited

U.S. PATENT DOCUMENTS 4,545,723 A * 10/1985 Clark ..................... B25J 15/04
294/86.4
4,853,771 A * 8/1989 Witriol ................... B25J 9/1697
348/94

(Continued)

FOREIGN PATENT DOCUMENTS

JP        2009106734 A        5/2009
JP        5814305 B2          11/2015
(Continued)

OTHER PUBLICATIONS

B. Siciliano & O. Khatib, Handbook of Robotics, published by Springer-Verlag Berlin (2008).
(Continued)

*Primary Examiner* — Dean J Kramer
(74) *Attorney, Agent, or Firm* — Richard Batt

(57) ABSTRACT

A robotic kitchen assistant for frying includes a robotic arm, a fryer basket, and a robotic arm adapter assembly allowing the robotic arm to pick up and manipulate the fryer basket. The robotic arm adapter includes opposing gripping members to engage the fryer basket. A utensil adapter assembly is mounted to the handle of the fryer basket, and the opposing gripper members are actuated to capture a three-dimensional (3D) feature of the utensil adapter assembly. The robotic arm adapter assembly can include an agitator mechanism to shake the fryer basket or another utensil as desired. Related methods are also described.

18 Claims, 18 Drawing Sheets

(51) Int. Cl.
| | |
|---|---|
| *B25J 19/02* | (2006.01) |
| *B25J 9/16* | (2006.01) |
| *A23L 13/50* | (2016.01) |
| *A23L 19/18* | (2016.01) |
| *A23L 5/10* | (2016.01) |
| *A47J 27/14* | (2006.01) |
| *A47J 37/12* | (2006.01) |
| *B25J 15/02* | (2006.01) |
| *B25J 15/00* | (2006.01) |
| *B25J 5/00* | (2006.01) |

(52) U.S. Cl.
CPC ........... *A47J 27/14* (2013.01); *A47J 37/1219* (2013.01); *A47J 37/1223* (2013.01); *A47J 37/1228* (2013.01); *A47J 37/1266* (2013.01); *B25J 5/007* (2013.01); *B25J 9/161* (2013.01); *B25J 9/1612* (2013.01); *B25J 9/1697* (2013.01); *B25J 15/0042* (2013.01); *B25J 15/0253* (2013.01); *B25J 15/08* (2013.01); *B25J 19/021* (2013.01); *A23V 2002/00* (2013.01)

(58) Field of Classification Search
CPC .... B25J 13/088; B25J 13/089; B25J 11/0045; A47J 37/1219; A47J 37/1223; A47J 13/1228; A47J 44/00
See application file for complete search history.

(56) References Cited

U.S. PATENT DOCUMENTS

| | | | |
|---|---|---|---|
| 4,919,950 A | 4/1990 | Mak | |
| 4,922,435 A | 5/1990 | Cahlander et al. | |
| 5,132,914 A * | 7/1992 | Cahlander | A47J 27/14 700/112 |
| 5,285,604 A | 2/1994 | Carlin | |
| 5,386,762 A | 2/1995 | Gokey | |
| 5,389,764 A | 2/1995 | Nishii et al. | |
| 5,458,384 A * | 10/1995 | Liu | B23Q 7/043 294/219 |
| 5,466,025 A * | 11/1995 | Mee | B25J 15/04 244/172.4 |
| 5,833,295 A | 11/1998 | Farlow, Jr. | |
| 5,893,051 A | 4/1999 | Tomohiro | |
| 7,174,830 B1 * | 2/2007 | Dong | B25J 9/0084 901/1 |
| 7,920,962 B2 | 4/2011 | D et al. | |
| 7,971,450 B2 | 7/2011 | Furlanetto et al. | |
| 8,276,505 B2 | 10/2012 | Buehler et al. | |
| 8,610,037 B2 | 12/2013 | Polt | |
| 8,820,313 B1 | 9/2014 | Lutes | |
| 9,285,589 B2 | 3/2016 | Osterhout et al. | |
| 9,483,875 B2 | 11/2016 | Theimer et al. | |
| 9,542,621 B2 | 1/2017 | He et al. | |
| 9,785,911 B2 | 10/2017 | Galluzzo et al. | |
| 9,815,191 B2 | 11/2017 | Oleynik et al. | |
| 10,005,184 B2 | 6/2018 | Gerio et al. | |
| 10,112,771 B2 | 10/2018 | D'andrea et al. | |
| 10,154,756 B2 | 12/2018 | Hall et al. | |
| 10,293,488 B2 | 5/2019 | Hall et al. | |
| 10,682,765 B2 * | 6/2020 | Mirkhaef | B25J 11/0045 |
| 2002/0082924 A1 | 6/2002 | Koether | |
| 2004/0111321 A1 | 6/2004 | Kargman | |
| 2004/0154474 A1 * | 8/2004 | Chan | A47J 37/1219 99/407 |
| 2005/0049940 A1 | 3/2005 | Tengler et al. | |
| 2005/0193901 A1 | 9/2005 | Buehler | |
| 2008/0110347 A1 | 5/2008 | Wong | |
| 2009/0192921 A1 | 7/2009 | Hicks | |
| 2013/0033057 A1 | 2/2013 | Markham | |
| 2013/0302483 A1 | 11/2013 | Riefenstein | |
| 2014/0157698 A1 | 6/2014 | Cihak et al. | |
| 2014/0184496 A1 | 7/2014 | Gribetz et al. | |
| 2014/0203012 A1 | 7/2014 | Corona et al. | |
| 2014/0324607 A1 | 10/2014 | Frehn et al. | |
| 2014/0334691 A1 | 11/2014 | Cho et al. | |
| 2014/0363266 A1 | 12/2014 | Cooper | |
| 2015/0290795 A1 | 10/2015 | Oleynik et al. | |
| 2016/0078694 A1 | 3/2016 | Swift | |
| 2016/0180546 A1 | 6/2016 | Kim et al. | |
| 2016/0239705 A1 | 8/2016 | Masood et al. | |
| 2016/0307459 A1 | 10/2016 | Chestnut et al. | |
| 2016/0327279 A1 | 11/2016 | Bhogal et al. | |
| 2016/0327281 A1 | 11/2016 | Bhogal et al. | |
| 2017/0011319 A1 | 1/2017 | Elliot et al. | |
| 2017/0130968 A1 | 5/2017 | Nagraj et al. | |
| 2017/0169315 A1 | 6/2017 | Vaca Castano et al. | |
| 2017/0206431 A1 | 7/2017 | Sun et al. | |
| 2017/0252922 A1 | 9/2017 | Levine et al. | |
| 2017/0305015 A1 | 10/2017 | Krasny et al. | |
| 2017/0348854 A1 | 12/2017 | Oleynik | |
| 2017/0364073 A1 | 12/2017 | Guy | |
| 2018/0345485 A1 | 12/2018 | Sinnet et al. | |
| 2020/0046168 A1 | 2/2020 | Sinnet et al. | |
| 2020/0047349 A1 | 2/2020 | Sinnet et al. | |
| 2020/0121125 A1 | 4/2020 | Zito et al. | |

FOREIGN PATENT DOCUMENTS

| | | |
|---|---|---|
| WO | 0170087 A2 | 9/2001 |
| WO | 2006006624 A1 | 1/2006 |
| WO | 2012020858 A1 | 2/2012 |
| WO | 2015100958 A1 | 7/2015 |
| WO | 2015143800 A1 | 10/2015 |
| WO | 2016040361 A1 | 3/2016 |
| WO | 2015125017 A3 | 6/2016 |
| WO | 2017114014 A1 | 7/2017 |
| WO | 2017103682 A3 | 8/2017 |
| WO | 2018031489 A1 | 2/2018 |

OTHER PUBLICATIONS

Beucher, Serge, and Fernand Meyer. "The morphological approach to segmentation: the watershed transformation." Optical Engineering—New Yark—Marcel Dekker Incorporated—34 (1992): 433-433.

Bonanni et al., "Counterintelligence: Augmented Reality Kitchen", CHI 2005, (Apr. 2, 2005), URL: http://citeseerx.ist.psu.edu/viewdoc/summary?doi=10.1.1.88.2875, (Jun. 12, 2018), XP055559956.

International Preliminary Examination Report dated Jul. 11, 2018 for PCT/US2018/020948.

International Preliminary Examination Report dated Jul. 20, 2018 for PCT/US2018/021066.

Ju Yong Chang, Haesol Park, In Kyu Park, Kyoung Mu Lee, Sang Uk Lee, GPU-friendly multi-view stereo reconstruction using surfel representation and graph cuts, Computer Vision and Image Understanding, vol. 115, Issue 5, 2011, pp. 620-634.

Kaiming He, Georgia Gkioxari, Piotr Dollar, and Ross B. Girshick, Mask R-CNN, arXiv, 2017.

Krystal B., The magic of Eatsa, explained, (Mar. 2, 2017), URL: https://www.washingtonpost.com/...017/03/02/57c95fb0-f55a-11e6-b9c9-e83fce42fb61_story.html?horedirect=on&utm_term=.108e357d67df, (May 21, 2018).

Lucas, Bruce D., and Takeo Kanade. "An iterative image regislialion technique with an application to stereo vision." (1981): 674-679.

Ohta, Yu-Ichi, Takeo Kanade, and Toshiyuki Sakai. "Color information for region segmentation." Computer graphics and image processing 13.3 (1980): 222-241.

Shaoqing Ren, Kaiming He, Ross Girshick, and Jian Sun, "Faster R-CNN: Towards Real-Time Object Detection with Region Proposal Networks Faster", IEEE Transactions on Pattern Analysis and Machine Intelligence, vol. 39 Issue 6, Jun. 2017.

* cited by examiner

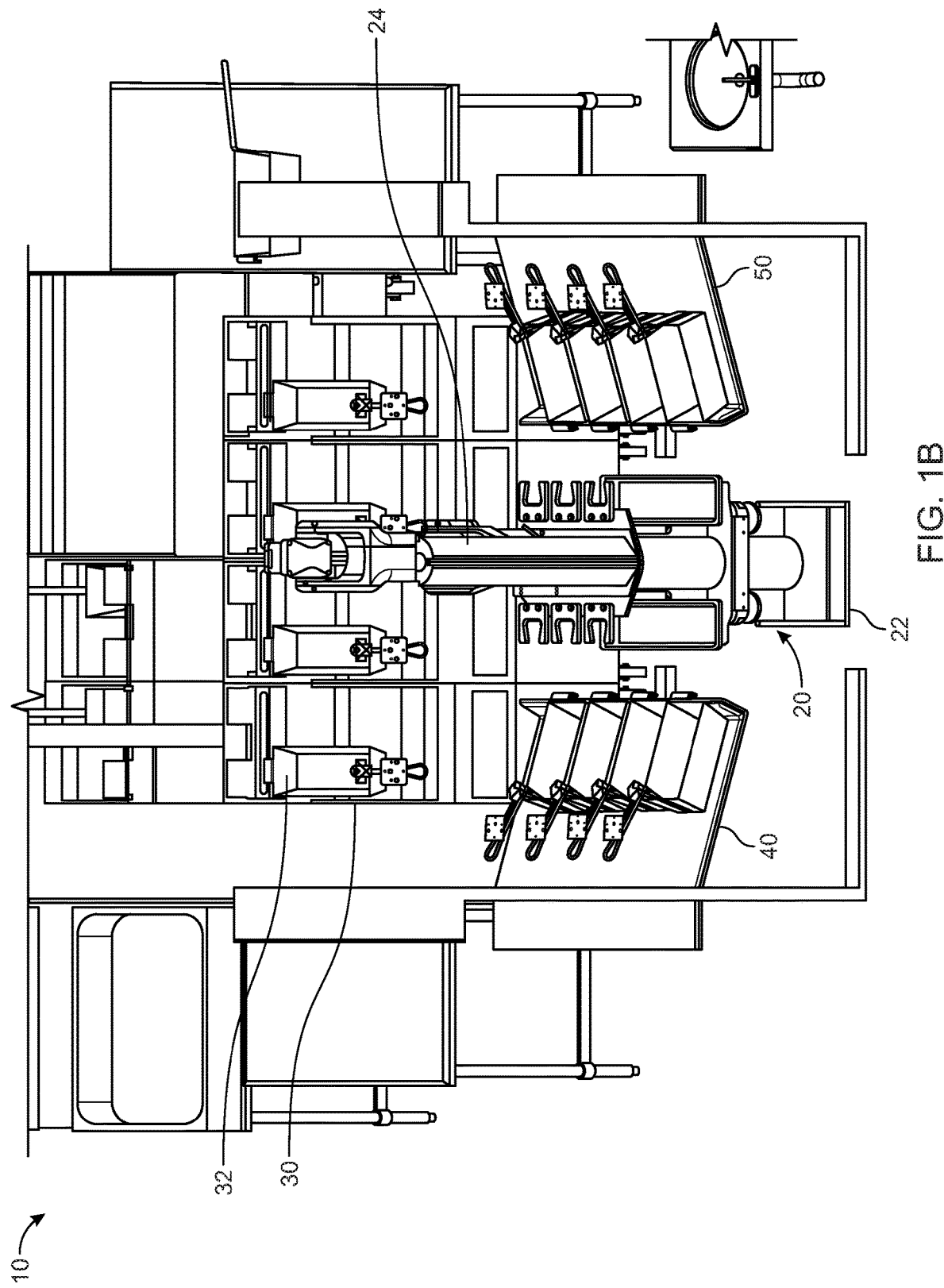

ROBOTIC KITCHEN ASSISTANT INCLUDING UNIVERSAL UTENSIL GRIPPING ASSEMBLY

CROSS-REFERENCE TO RELATED APPLICATIONS

This claims priority to application No. 62/717,725, filed Aug. 10, 2018, and entitled "ROBOTIC KITCHEN ASSISTANT FOR FRYING INCLUDING GRIPPER AND AGITATOR" and to application No. 62/757,601, filed Nov. 8, 2018, and entitled "ROBOTIC KITCHEN ASSISTANT FOR FRYING INCLUDING UNIVERSAL ADAPTER ASSEMBLY FOR GRIPPING AND SHAKING UTENSIL", each of which is incorporated herein in its entirety for all purposes.

BACKGROUND OF THE INVENTION

1. Field of the Invention

This invention relates to kitchen appliances and more particularly to robotic kitchen apparatuses for operation with a fryer in a restaurant environment.

2. Description of the Related Art

There are a number of challenges associated with operation of a fryer in a restaurant environment and additional challenges associated with automating the frying process.

First, placing a fryer basket in and out of the fryer to cook the food is fraught with danger arising from the hot oil. The fryer, the basket, the food items, and the oil have very high temperatures which can burn human workers during operation.

Employing automated processes to manipulate fryer baskets in a restaurant kitchen is not straightforward due to the wide range of operations that are involved with frying food items not the least of which is accurately locating and picking up the fryer basket. The so-called tolerance stack-up in today's kitchen environments is difficult to control because the shapes and tolerances of kitchen implements (baskets get bent) and kitchen equipment are not manufactured to high tolerances, and vision and depth sensors are not perfectly accurate.

Additionally, even if the fryer basket is successfully grasped and placed in the fryer, the food tends to clump while cooking in a fryer. Clumping introduces non-uniform temperatures to the food being cooked, or worse, leads to un-cooked food. Traditionally, a human operator will shake the fryer basket by hand, and observe the absence of clumping. The shaking process requires extra time and attention by a human operator which is undesirable. Automating this process is also challenging because of the large amounts of power, high frequency motion, and high peak forces associated with the shaking process, which are difficult to replicate in a reliable manner with traditional automation solutions. Another challenge is limiting or isolating the 'shaking' to the food item or utensil to be shook, and to avoid unduly shaking the balance of the automated food preparation equipment.

Additionally, while frying baskets of food, food debris separate from the food and remain in the oil. Over time, they burn and impart a burnt taste to other food cooked in the fryer. It is desirable to skim the fryer regularly to prevent particulates from burning. Traditionally, a human operator will skim the fryer between sets of baskets and remove the particulates from the skimmer by, e.g., banging the handle of the skimmer against the rim of a trash can.

Accordingly, a robotic kitchen assistant that overcomes the above mentioned challenges is still desirable.

SUMMARY OF THE INVENTION

A robotic kitchen assistant for frying includes a robotic arm, a fryer basket, and a robotic arm adapter adapted to releasably engage the fryer basket.

In embodiments, the robotic arm adapter includes opposing movable gripping members having a first open configuration when the gripping members are separated, and a second closed configuration when the gripping members are urged towards one another.

In embodiments, when the gripping members are in the second closed configuration, the opposing gripping members define a capture region to engage the fryer basket.

In embodiments, a utensil adapter assembly is secured to the fryer basket, and the capture region is sized to engage a target feature of the utensil adapter assembly.

In embodiments, the target feature of the utensil adapter assembly comprises a 3D shape such as a diamond, sphere, hourglass, or bulb.

In embodiments, each of the opposing gripping members comprises protruding fingers or teeth which register with a recess, cut-out, slot, or narrow region associated with the target feature of the utensil adapter assembly. In embodiments, angled faces or bearing surfaces guide the gripping teeth into the recess or clamping plane defined by the target feature.

In embodiments, a robotic kitchen assistant is operable to shake the fryer basket. The robotic kitchen assistant can include an agitator actuator operable to shake or move the gripping members while holding the fryer basket. In embodiments, the robotic kitchen assistant shakes or vibrates the fryer basket to de-clump food items therein, and without substantially moving links and components proximal to the agitator actuator. The agitator actuator and its motion is isolated from the balance of the robotic arm.

In embodiments, the robotic kitchen assistant includes a latching assembly to detachably mount the robotic stand to the ground in the kitchen restaurant. In embodiments, the latching assembly includes a weighted base enclosure, a bolt plate secured to the base and comprising a plurality of holes for bolts to be inserted therethrough, and a plurality of rollers to facilitate moving the robotic kitchen assistant when unbolted from the ground.

In embodiments, the robotic kitchen assistant is operable to pick up a skimmer and to manipulate the skimmer through the fryer to collect food debris from the fryer. The robotic kitchen assistant is further operable to dump the food debris from the skimmer by contacting a waste receptacle. In embodiments, an enclosed waste receptacle includes an air stream directed at the skimmer when the skimmer is inserted therein. The air stream separates the food from the skimmer and into the waste receptacle. In embodiments, sensors are used to direct the robotic kitchen assistant's motion as it skims the oil to maximize its effectiveness and efficiency.

In embodiments, a robotic kitchen system includes a robotic kitchen assistant, a fryer, a fryer basket transfer station, a waste receptacle including an air stream, and a plurality of utensils. In embodiments, the utensil is equipped with a utensil adapter assembly for the robotic kitchen assistant to engage during operation.

In embodiments, a universal robotic utensil pickup system includes a robotic arm adapter for connecting to a robotic arm and a utensil adapter assembly for connecting to the utensil, and preferably, the utensil handle. The robotic arm adapter assembly includes opposing movable gripping members having a first open configuration when the gripping members are separated, and a second closed configuration when the gripping members are urged towards one another. When the gripping members are in the second closed configuration, the opposing gripping members define an open capture region to engage a target feature of the utensil adapter assembly secured to the handle of the utensil.

Methods of frying include use of the robotic kitchen assistant and components for picking up the utensils, using the utensils, and removing debris from the utensils.

The description, objects and advantages of embodiments of the present invention will become apparent from the detailed description to follow, together with the accompanying drawings.

BRIEF DESCRIPTION OF THE DRAWINGS

FIG. 1B is a back perspective view of the robotic kitchen assistant and kitchen environment shown in FIG. 1A;

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Described herein is a robotic kitchen assistant for frying various food items in a fryer, and in embodiments, for removing food debris from the fryer.

Fryer Operation Overview

Figure 1A:
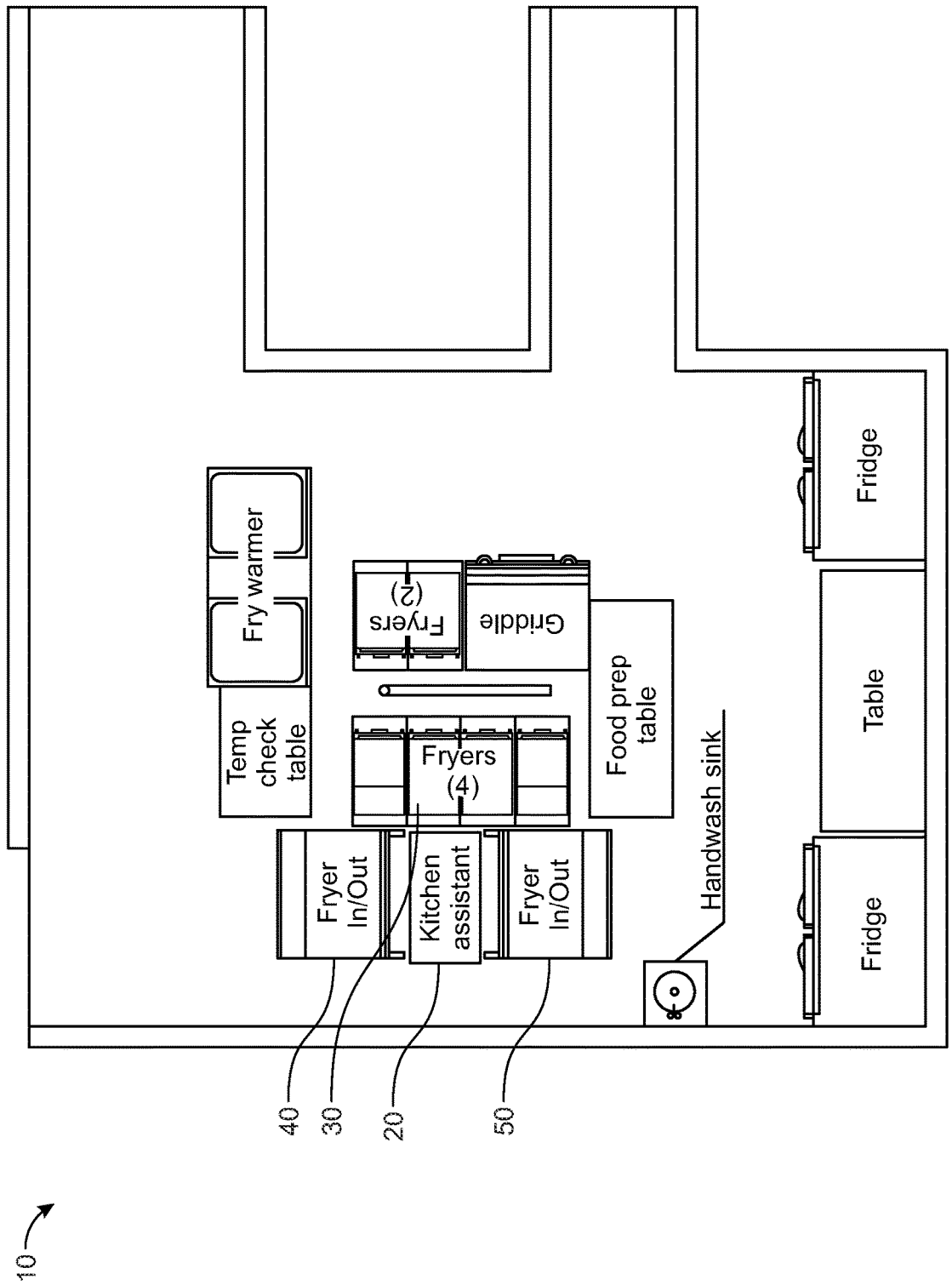
FIG. 1A is a top view of a robotic kitchen assistant for frying in a kitchen environment.
Figure 2A:
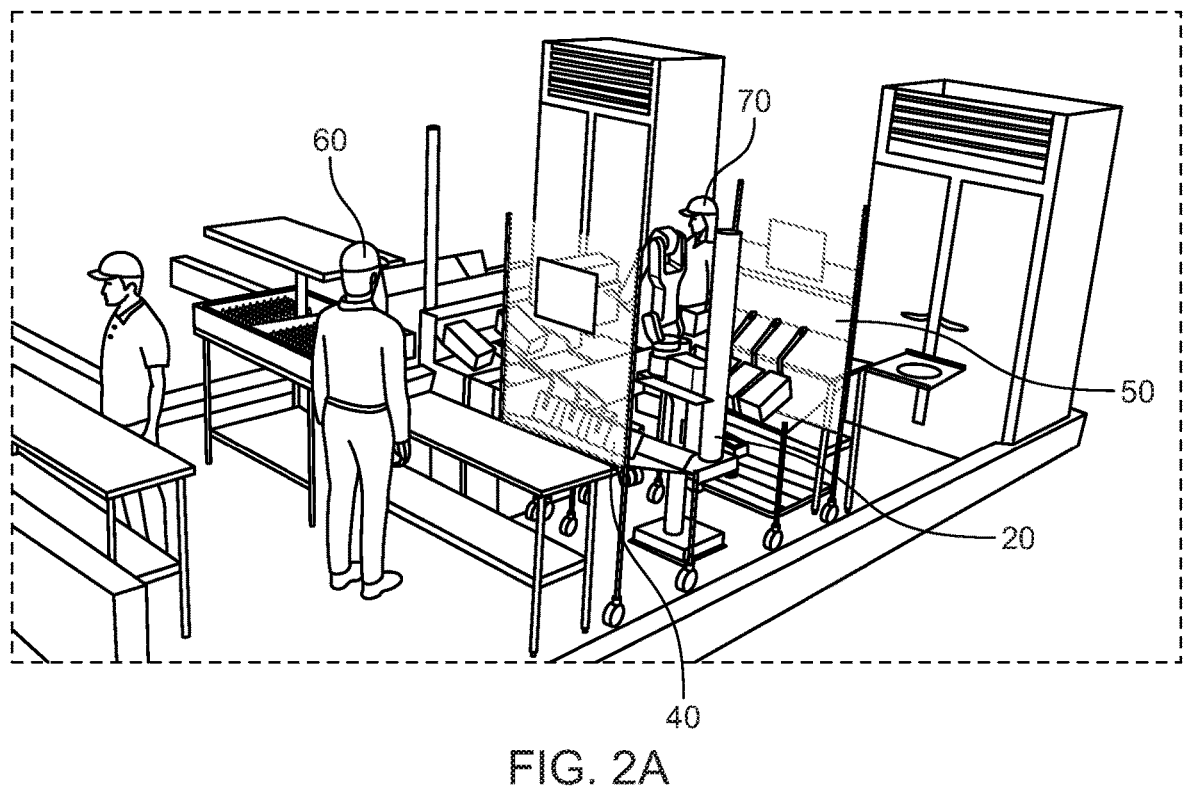
FIGS. 2A-2D are various perspective views of the kitchen environment shown in FIGS. 1A-1B including human workers.
Figure 2B:
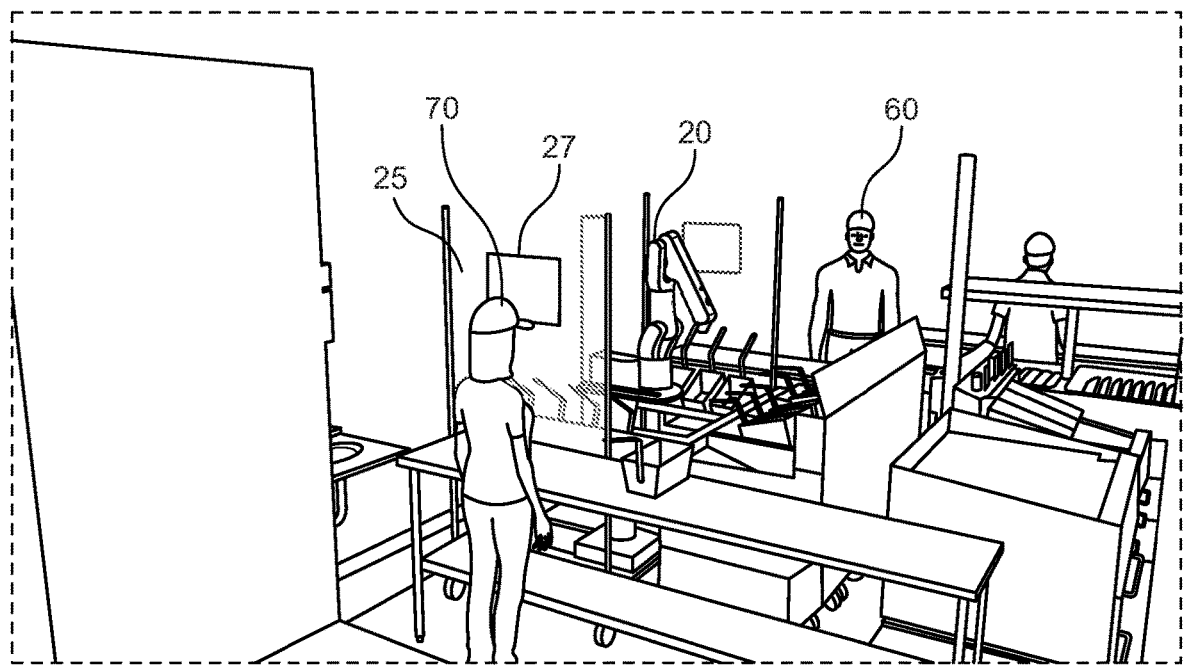
Figure 2C:
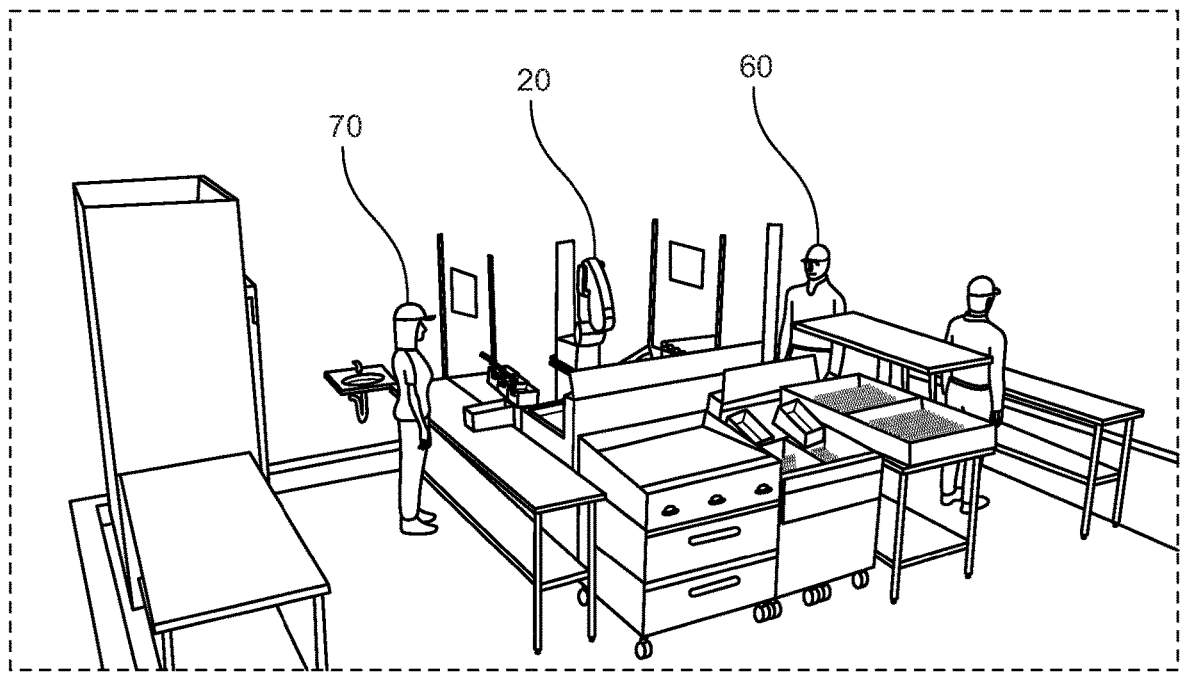
Figure 2D:
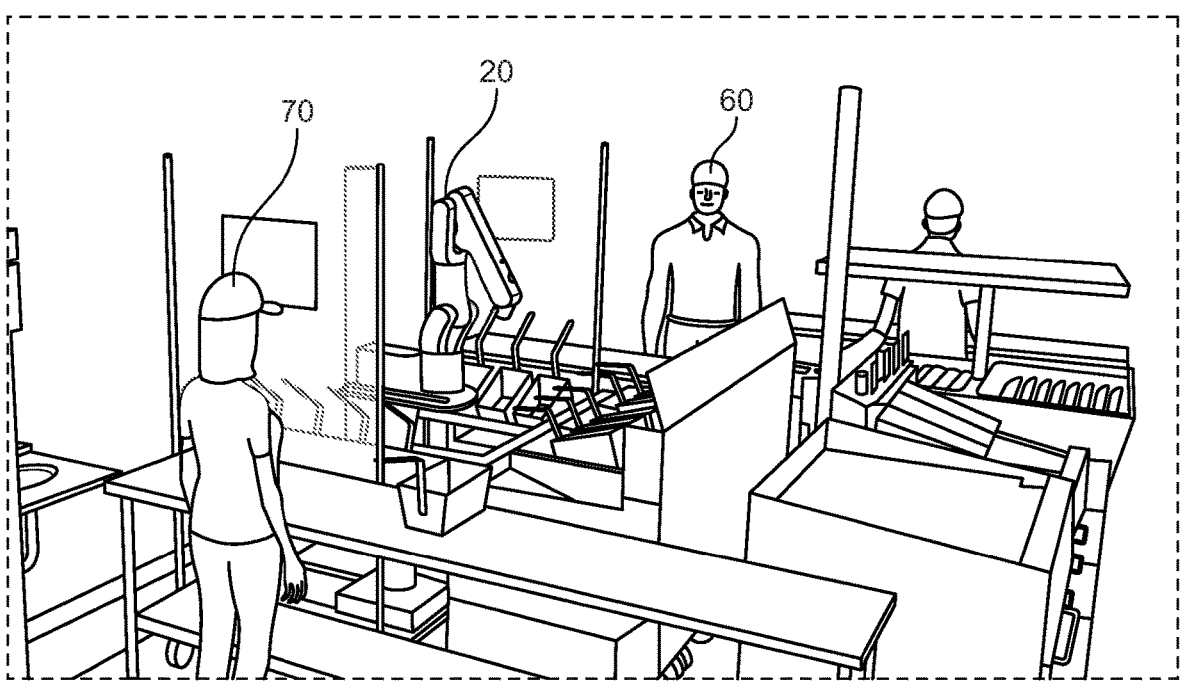

A top view and a rear perspective view of a kitchen environment 10 including a robotic kitchen assistant 20 for frying are shown in FIGS. 1A and 1B, respectively.

The robotic kitchen assistant 20 can comprise a base or housing 22, robotic arm 24, and end effectors (not shown) as described, e.g., in international application No. PCT/US18/21066, filed Mar. 6, 2018, entitled "ROBOTIC KITCHEN ASSISTANT FOR PREPARING FOOD ITEMS IN A COMMERCIAL KITCHEN AND RELATED METHODS", and international application No. PCT/US18/20948, filed Mar. 5, 2018, entitled "AUGMENTED REALITY-ENHANCED FOOD PREPARATION SYSTEM AND RELATED METHODS", each of which is incorporated by reference in its entity for all purposes.

In embodiments, the robotic kitchen assistant includes a programmable processor, memory, cameras and sensors, displays, links, joints, actuators, power supply, and various user interface devices, to communicate, compute, and control movements of the robotic arm and end effectors including the gripping means described herein to operate with a fryer in a restaurant kitchen. In embodiments, and as described in the patent publications mentioned herein, the robotic kitchen assistant employs a trained neural network to locate and recognize food items and the utensils to manipulate.

With reference again to FIGS. 1A and 1B, a plurality of Fryers (e.g., a deep fryers) 30 and tables (shown as Fryer In/Out, or another human/robot collaborative workspace) 40, 50 are shown in the vicinity of the robotic kitchen assistant 20. The robotic kitchen assistant 20 is operable to manipulate baskets 32 from the basket holding stations 40, 50 to the Fryer 30, and vice versa. As described further herein, the robotic kitchen assistant 20 also has robust capabilities to grip the baskets 32 or other implements, as well as agitate or shake the basket to facilitate cooking fried items.

Perspective views of the robotic kitchen assistant 20 for frying are shown in FIGS. 2A-2D. The robotic kitchen assistant 20 is adapted to work alongside fryer 30 and kitchen workers 60, 70. Optionally, a shield 25 is arranged vertically to prevent the kitchen assistant from entering the robotic arm space. Additionally, a display 27 (e.g., a touch screen display) is arranged on the shield of the basket transfer station 40, 50. The display can communicate instructions and status of the food preparation to the kitchen assistants as well as allow the kitchen assistants to provide input or adjustments to operation of the robotic kitchen assistant and cooking menu items, as discussed further herein.

Although the FIGS. 2A-2D show the robotic kitchen assistant 20 operable with four fryers, other embodiments include a robotic kitchen assistant operating with more or less fryers.

The robotic kitchen assistant is operable to perform a wide range of steps including but not limited to actions otherwise taken by a human worker as the kitchen assistant fries various food items. In some embodiments, the robotic kitchen assistant is operable to perform a portion of the steps to fry, assisting the chef.

In a particular embodiment, a method comprises the following steps:

1. Chef prepares food and puts food in basket.
2. Chef puts basket in human/robot collaborative workspace (e.g., a table, rack, or custom basket transfer station). Optionally, a safety scanner is incorporated into the robotic kitchen assistant workspace to prevent robot and human from working in the same workspace at same time.
3. Robotic kitchen assistant identifies there is a basket, then inspects and classifies the food, assigning a cooking process to the food. Features for determining cooking process are: Food type, food initial thermodynamic state, food size, and food shape.
4. Robotic kitchen assistant monitors the current state of system (current # of baskets and their cook time) and optimizes the cooking process using machine learning optimization algorithms such as Monte Carlo Tree Search for quality or throughput or any given metric and schedules the appropriate cooking actions to hit that target.
5. Robotic kitchen assistant acts on the basket (e.g., dips in fryer, agitates, hangs to drip, removes from fryer).

The robotic kitchen assistant localizes the basket to be picked up and manipulated. The robotic kitchen assistant is operable to locate and manipulate a wide variety of kitchen implements in all 6 DOF in order to act on them. Nonlimiting techniques for localizing are described in patents and publications mentioned herein.

In embodiments, and as discussed further herein, basket pickup by the robotic kitchen assistant is enhanced by a robotic arm adapter assembly having a gripping feature, and a utensil adapter assembly comprising a target for the gripping feature to capture. The gripper apparatus or grasper enhancement mitigates error arising from noise in the location estimation and provides a more robust system to pick up or collect food preparation items such as a fryer basket.

6. The robotic kitchen assistant will place the basket in another human/robot collaborative workspace (e.g., a table or shelf such as the station 40, 50).
7. Chef can remove basket and perform temperature check. In embodiments, the robotic kitchen assistant removes the basket and a robotic arm or mechanism is used to insert a temperature probe to perform the temperature check. In embodiments, an IR camera is used to estimate temperatures.
8. In embodiments, the temperature data is fed back to optimize cooking process. Also, in embodiments, the robotic kitchen assistant employs control algorithms, such as model predictive control, on the fryer to preemptively turn on fryer when food is about to get dropped.
9. Optionally, food is manually cooked longer if more time is needed to cook the food, or a user input of additional cook time is fed back into system if more cook time is needed.

Basket Transfer Station

Figure 3:
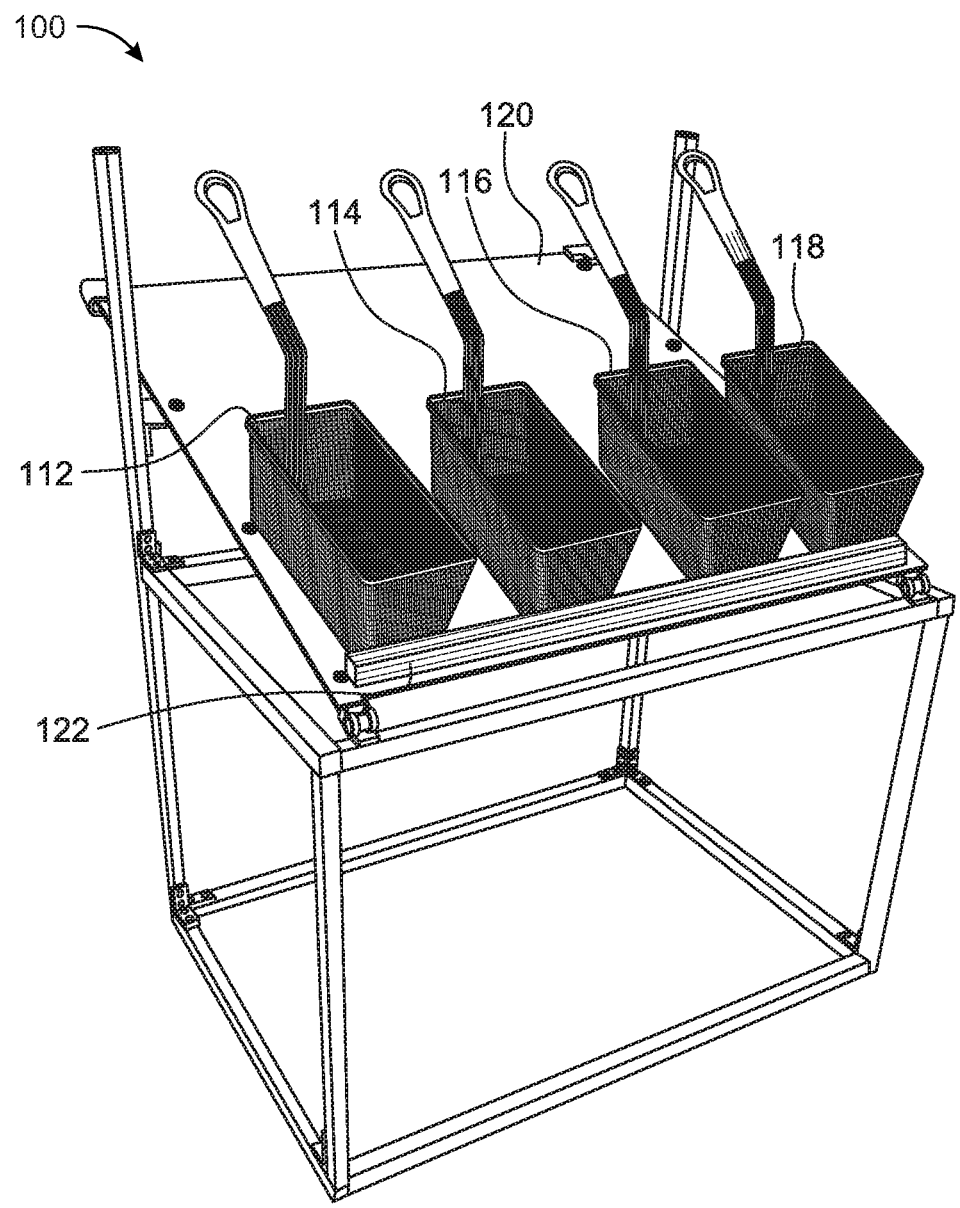
FIG. 3 is a perspective view of a fryer basket transfer station including four fryer baskets.

As described above in a frying method, the robotic kitchen assistant places the basket in a collaborative workspace such as a table, rack, or transfer station. With reference to FIG. 3, a basket transfer station 100 and baskets 112, 114, 116, and 118 are shown in accordance with an embodiment of the invention. The basket transfer station 100 serves to hold the baskets and has an inclined sliding surface 120 that guides the baskets from the workers to the robot area which can be put next to or in continuation to a table to minimize the need for lifting the baskets by the workers. Stop 122 holds the baskets at the lower edge of the sliding surface 120. Though the size of the station is shown to accommodate four baskets, the size of the station may vary to accommodate more or less baskets. In embodiments, the size accommodates 2-6 baskets.

Figure 4:
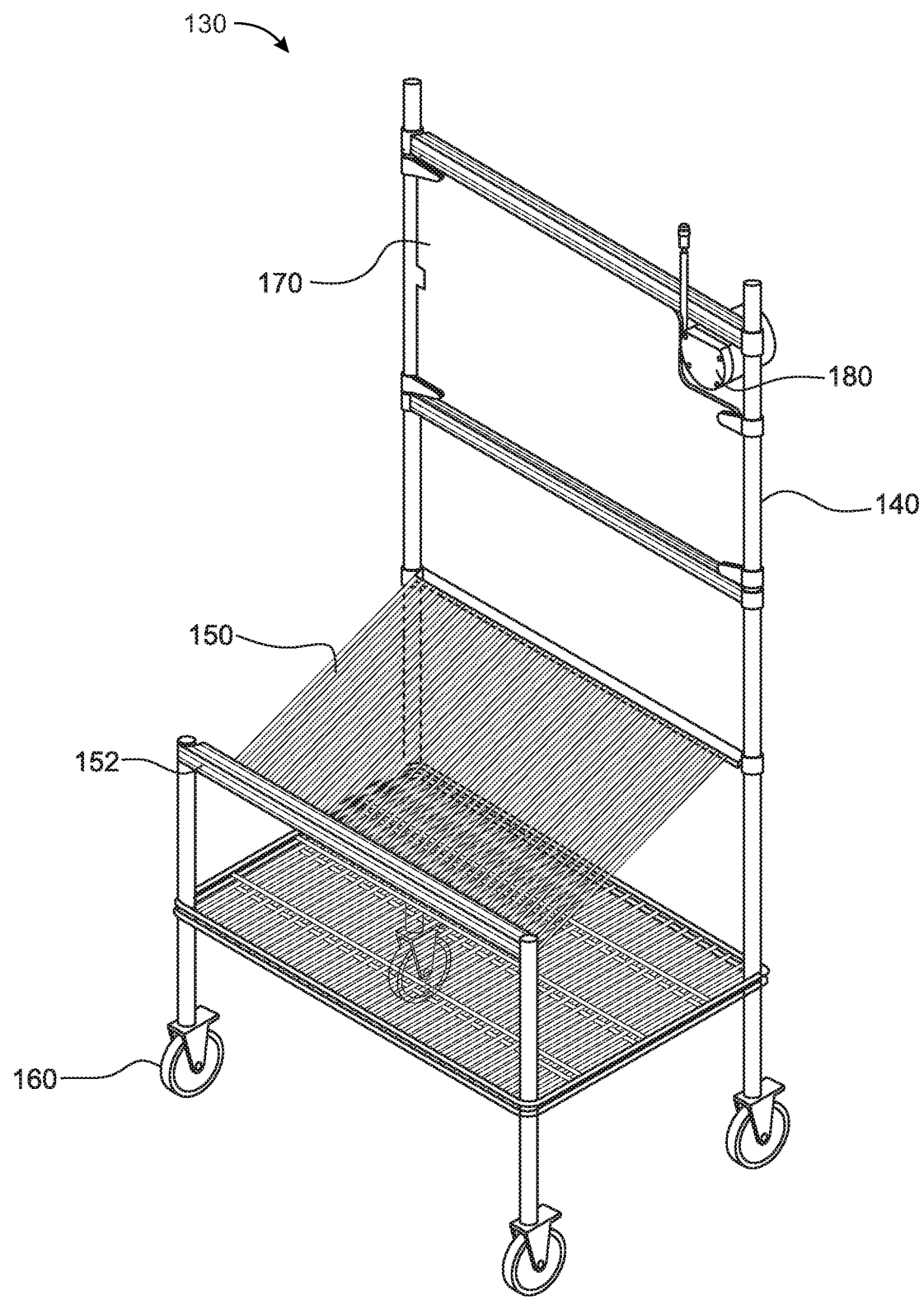
FIG. 4 is a perspective view of another fryer basket transfer station including a safety shield, sensor module, and rollers.

FIG. 4 shows another transfer station 130 including frame 140, rack 150, stop 152, wheels 160, and physical barrier (e.g., poly-carbonate shield) 170 to prevent humans from having access to the robot area. The transfer station 130 additionally shows a safety scanner 180 to prevent the robotic kitchen assistant from moving baskets (not shown) in the rack area 150 when an unknown object enters the scanner curtain. Optionally, a dripping tray (not shown) can be added to the station to prevent oil from dripping on the floor. Additionally, a display may be added to the shield as described above in connection with FIGS. 2A-2D.

Gripper Operation

Figures 5A, 5B:
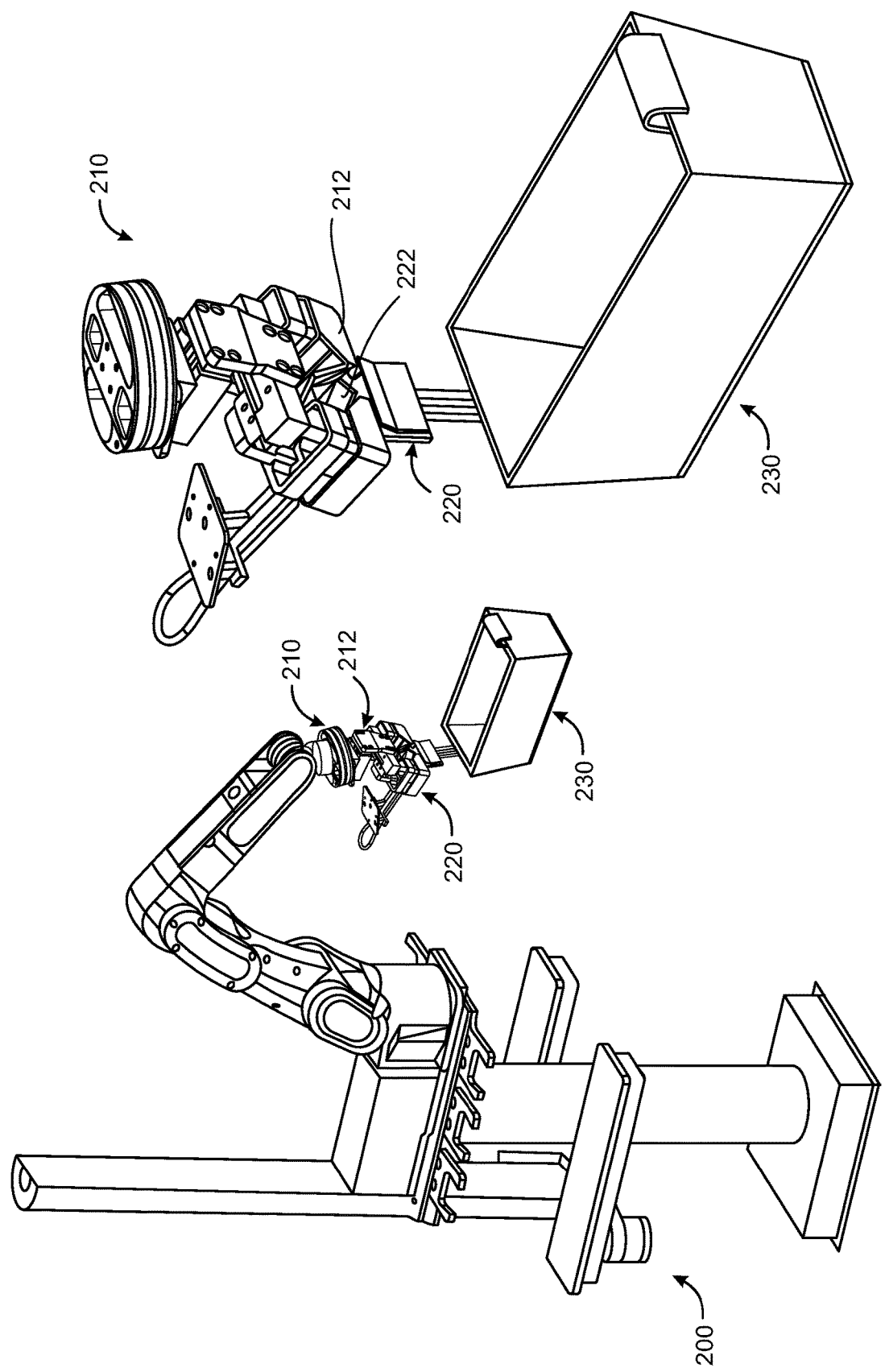
FIG. 5A is a perspective view of a robotic kitchen assistant holding a fryer basket.
FIG. 5B is an enlarged perspective view of a portion of the robotic kitchen assistant holding the fryer basket.

With reference to FIGS. 5A-58, a robotic kitchen assistant 200 is shown including a robotic arm adapter assembly 210 including a gripping feature 212, a utensil adapter assembly 220 comprising a target 222 for the gripping feature 212 to capture. The robotic adapter assembly and utensil adapter assembly enables large tolerances for grabbing kitchen equipment (e.g. fryer basket 230) with a custom grab point attached to the equipment while still maintaining a rigid grip after engaging the equipment.

Embodiments of the invention described herein overcome the challenge of the so-called tolerance stack-up in today's kitchen environments because it is difficult to control the shapes and tolerances of kitchen implements (baskets get bent), kitchen equipment is not manufactured to high tolerances, and vision and depth sensors are not perfectly accurate.

Figure 6:
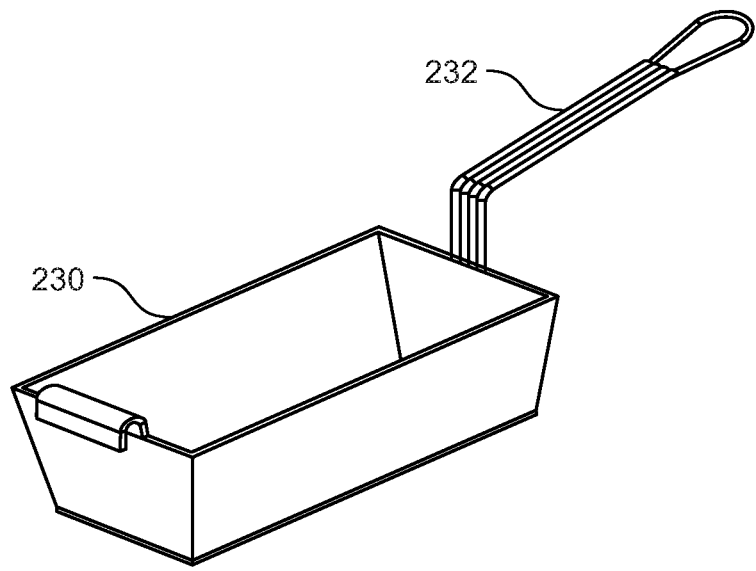
FIG. 6 is a front perspective view of a fryer basket.
Figure 7:
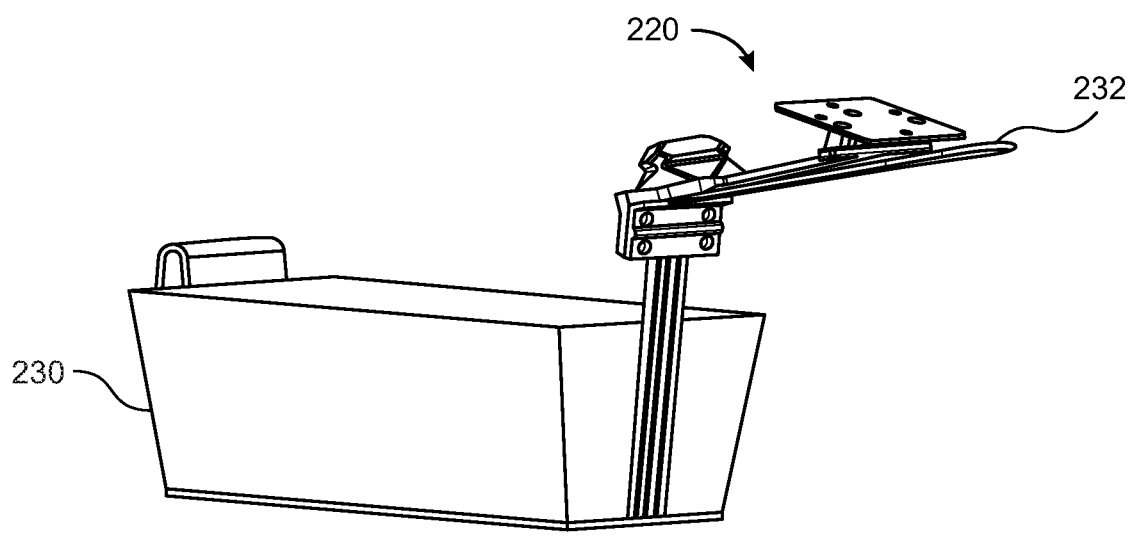
FIG. 7 is a rear perspective view of a fryer basket and a utensil adapter secured to the basket handle.

With reference to FIGS. 6-7, an enlarged view of a basket 230 is shown comprising a handle 232 to which the utensil adapter assembly 220 may be secured.

Figure 8A:
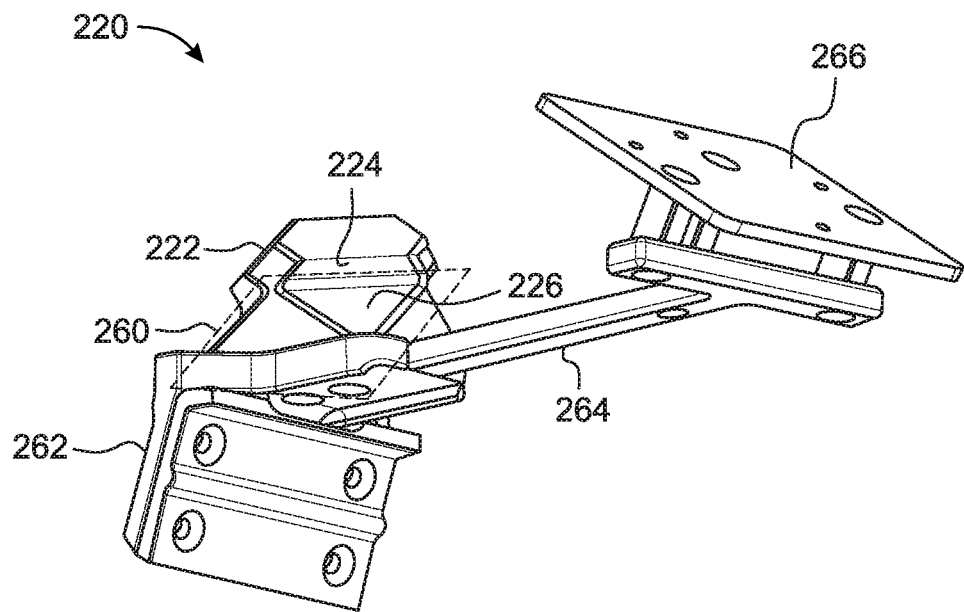
FIGS. 8A-8B are various perspective views of the utensil adapter shown in FIG. 7 with the fryer basket removed for clarity.
Figure 8B:
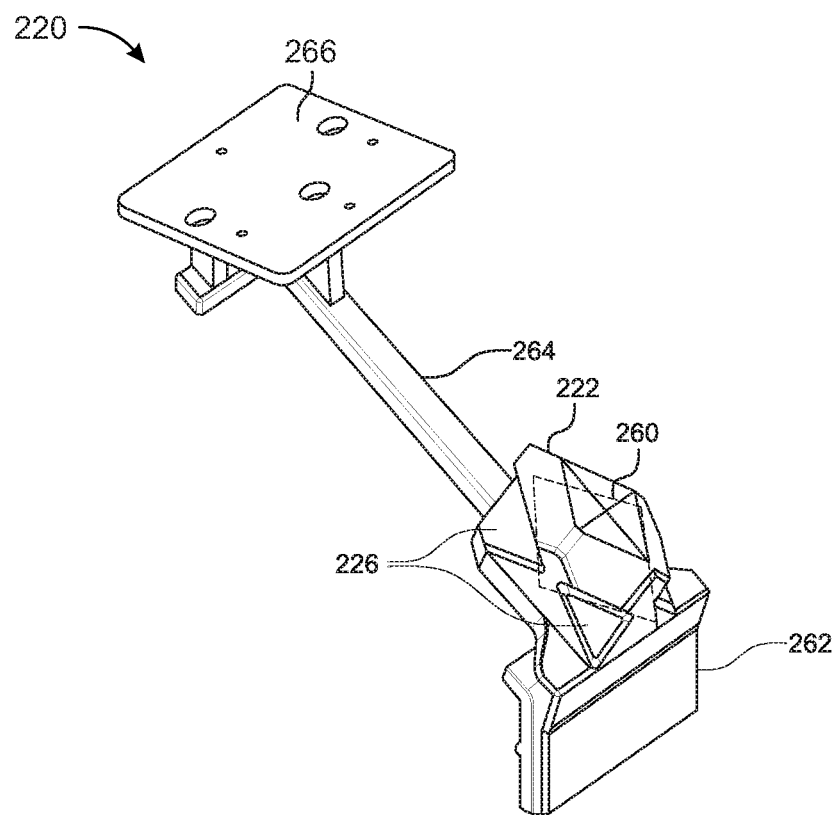

FIGS. 8A-8B show enlarged perspective views of the utensil adapter assembly 220 including a clamp 262 to engage the handle of the basket, a body 264, a target feature 222 to be captured by the robotic arm adapter assembly, and a computer vision (CV) marker mount 266 for the cameras to view for location information.

The target feature 222 shown in FIGS. 8A-8B has a diamond-shape and eight bearing surfaces 224, 226.

Figure 9:
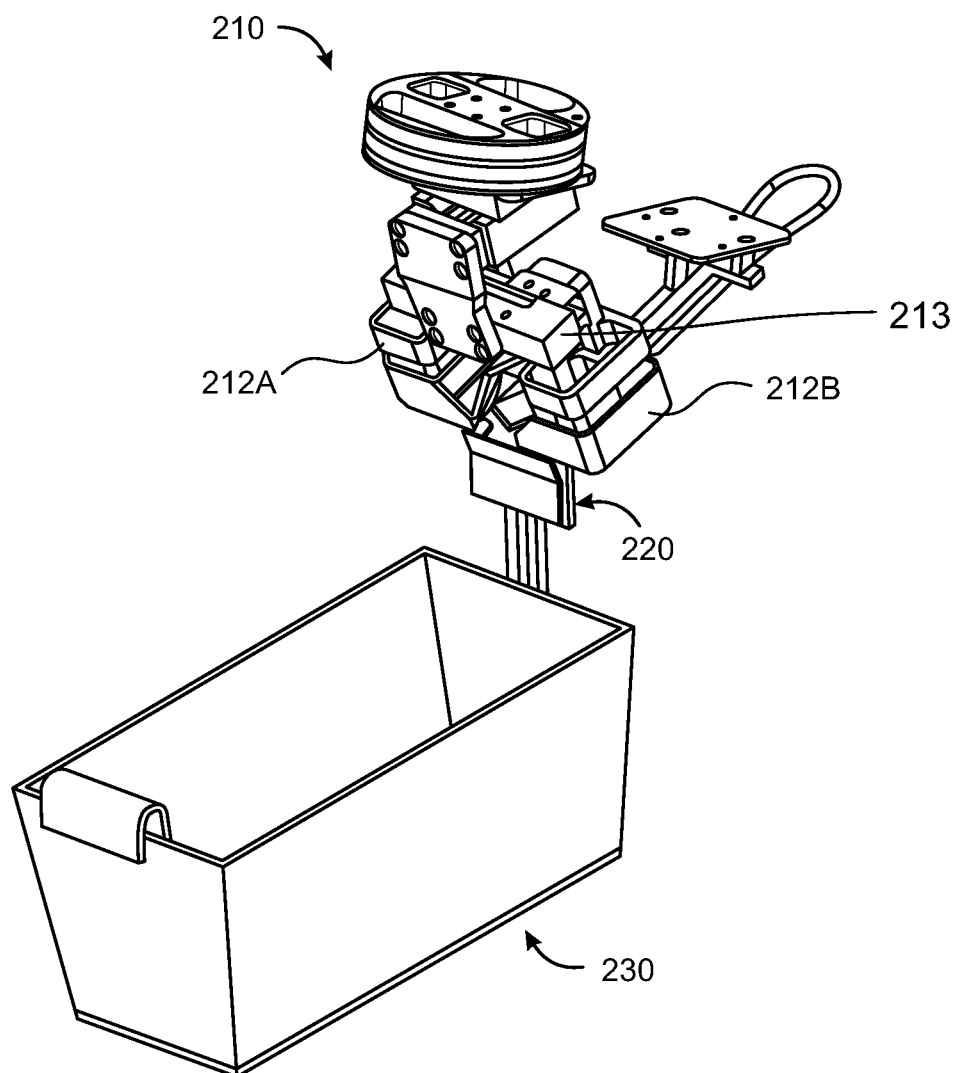
FIG. 9 is an enlarged perspective view of a fryer basket, a utensil adapter secured to the fryer basket, and a robotic arm adapter for engaging the utensil adapter.
Figure 10:
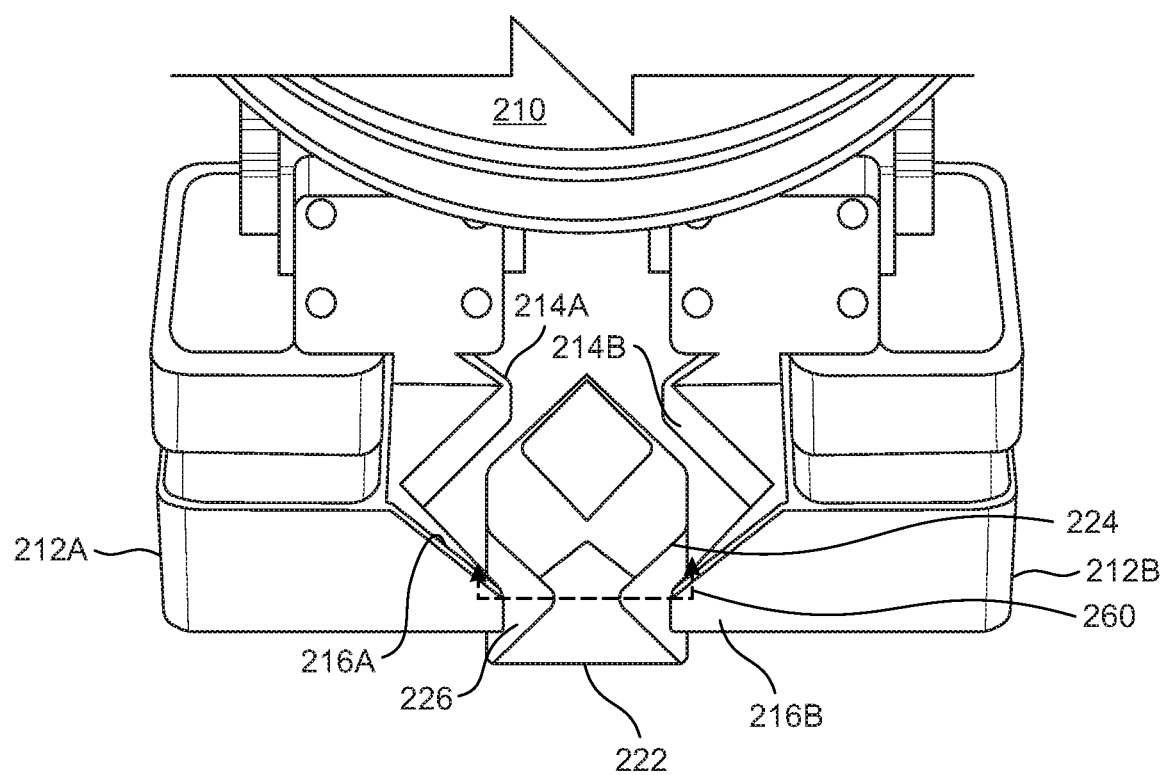
FIG. 10 is an enlarged view of a portion of a robotic arm adapter engaging a target feature of a utensil adapter in accordance with one embodiment of the invention.

With reference to FIGS. 9-10, parallel actuating gripper 212A, 212B and two "fingers" (or teeth) 214A 214B, 216A 216B serve to initially contact the four lower bearing surfaces 226 on the target 222 and then slide up until contact is made with the four upper bearing surfaces 224. The four upper bearing surfaces 224 and the top of the diamond 222 are made as small as possible so as to not restrict horizontal grabbing tolerances while the robot arm approaches from above. By gripping below the clamp plane 260, symmetric tolerances can be attained in both horizontal and vertical dimensions. In a sense, the angled bearing surfaces or faces guide the teeth into the desired recess, slot, detent, or clamping plane 260.

The parallel actuating gripper members 212A 212B shown in FIG. 9 are driven by an actuator 213, which in embodiments, is pneumatic-based.

A process to grab a handle of a basket or another food preparation item in accordance with an embodiment of the invention comprises the following steps:

1. Robotic kitchen assistant obtains estimate of basket handle in 6 DOF using sensors and knowledge of prior state.

2. Robotic kitchen assistant aims to capture the target slightly lower than the clamp plane to account for additional error. This is because of the way gripper mechanism is designed; z tolerance in the up-direction cuts into x and y tolerance because top of gripper diamond is larger.

3. Robotic kitchen assistant grabs handle. In embodiments, the gripper mechanism is designed to self-center and positive lock in same location given 0.75"×0.75"×0.5" tolerances and +/−5 deg in orientations.

4. In embodiments, force feedback is used to validate that the gripper has solid grip on basket and confirm pickup and that the basket is not stuck on anything. In embodiments, the robotic kitchen assistant uses sensors to measure or monitor applicable forces. In embodiments, the robotic kitchen assistant uses sensors to measure motion of the basket relative to the gripper to improve the grabbing motion.

Agitator

In embodiments, the robotic kitchen assistant is operable to de-clump fried food so that the fried food may be cooked uniformly before final serving and in particular embodiments, an actuator assembly is operable to cause the fryer basket to shake and de-clump the fried food.

Figure 11A:
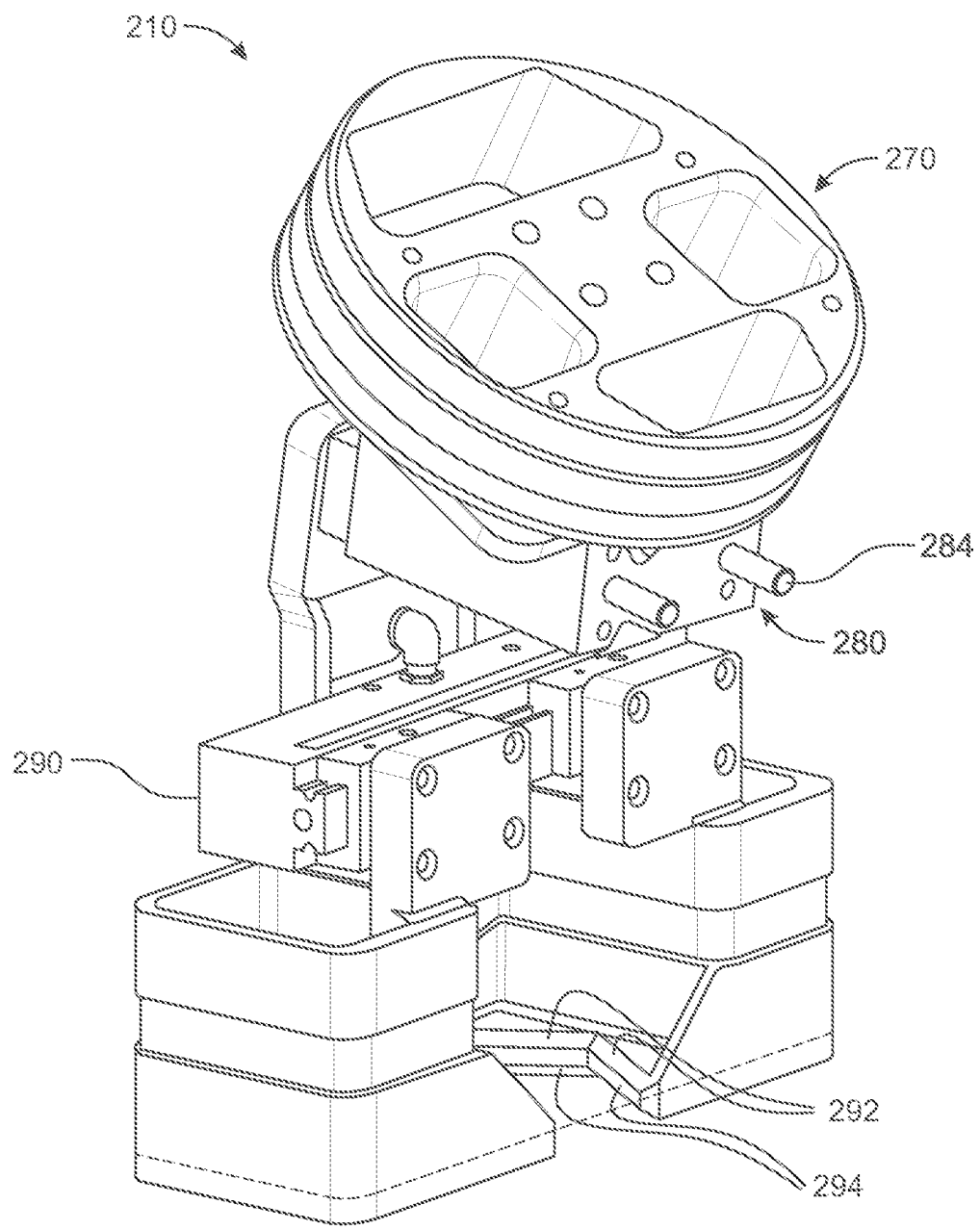
FIGS. 11A-11B are rear and front upper perspective views, respectively, of a robotic arm adapter in accordance with one embodiment of the invention.
Figure 12:
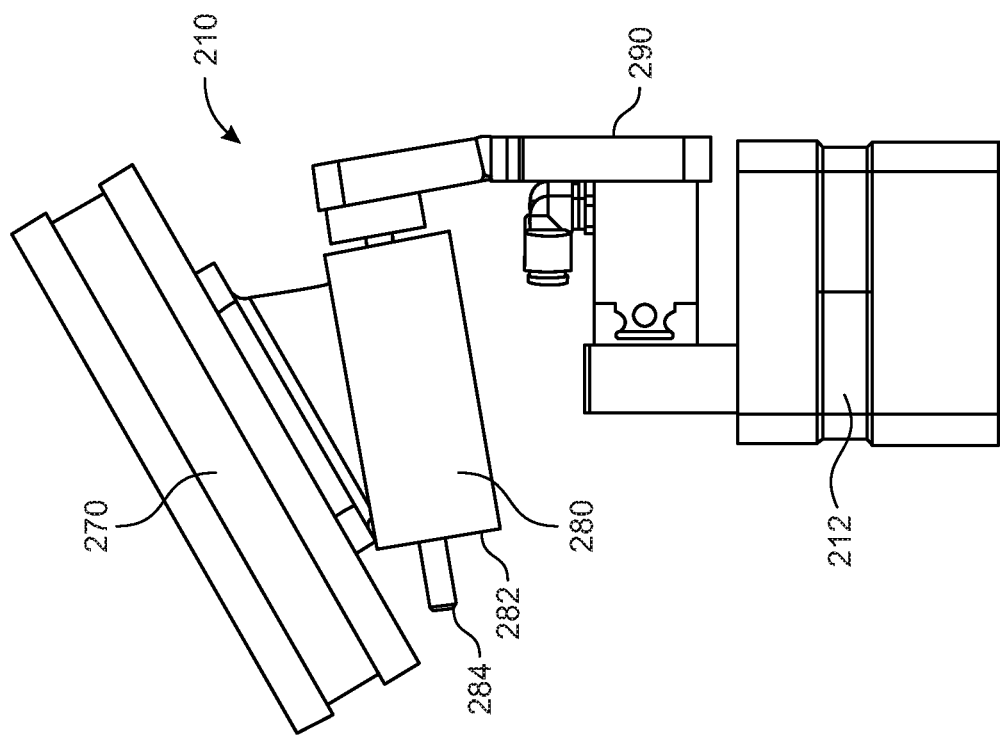
FIG. 12 is a side view of the robotic arm adapter shown in FIGS. 11A-11B.
Figure 11B:
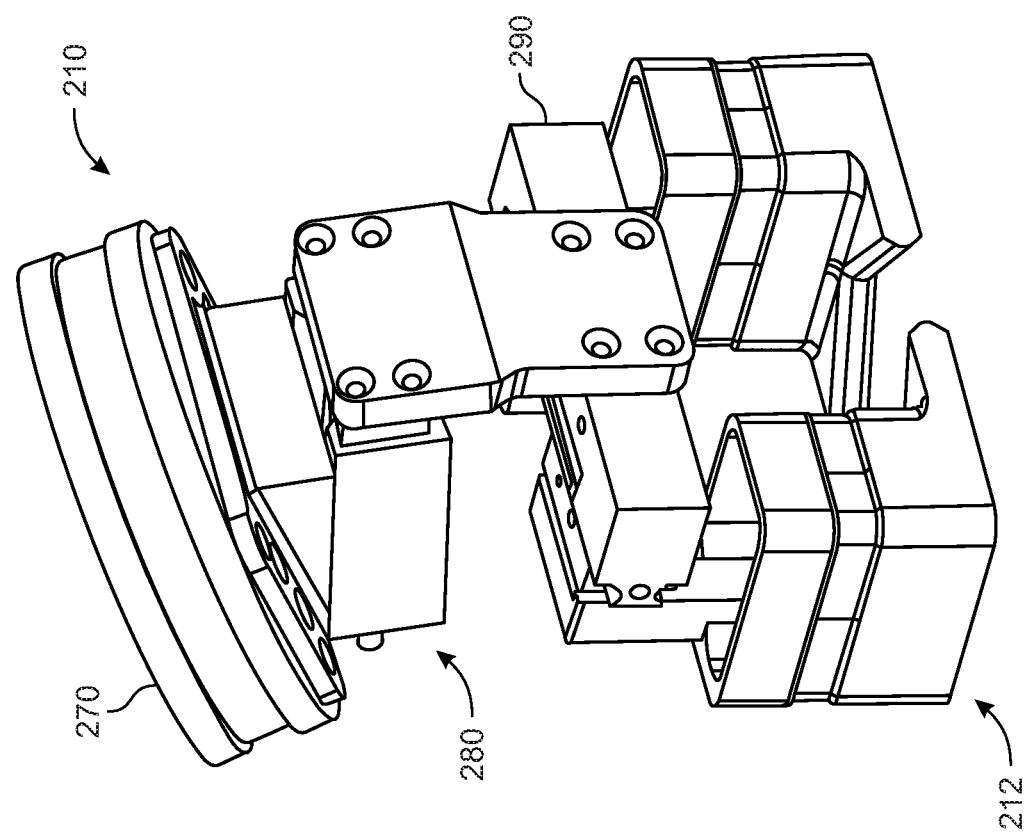

FIGS. 11A-12 show various views of a robotic arm adapter assembly 210 including a robotic arm interface 270, an agitator assembly 280, and a gripper portion 212. The agitator assembly 280 shown in this embodiment includes a pneumatic actuator 282, two linear bearings, and two guides 284. The actuator 282 is pulsed causing the basket to shake. Although a pneumatic actuator is described, the invention is not so limited and other types of actuators may be used such as, e.g., a flat DC motor.

In embodiments, a robotic arm adapter assembly comprises a gripper and at least one lock actuator (not shown) to lock the position of the fryer basket relative to the robotic arm when the at least one lock actuator is activated. The gripper engages the fryer basket using a combination of bearing surfaces 292 294, springs, and/or flexures that provide low resistance to motion in a limited number of directions as described herein.

Additionally, the robotic arm adapter assembly can include a separate agitation actuator (e.g., component 280). When the basket is placed in the fryer by the robotic kitchen assistant, the lock actuator (not shown) is disengaged and the agitation actuator 280 shakes the basket. The low resistance to motion between the basket and the robotic arm prevents the agitator actuator from imparting significant forces on the robot arm, which could damage the robotic arm. Once the agitation is complete, the agitation actuator is stopped and the lock actuator engages and the basket is moved by the robotic arm.

In embodiments, and with reference to the agitator shown in FIGS. 11A-12, a method to prevent food from sticking together in a basket in a fryer comprises the following steps:

1. Robotic kitchen assistant identifies and localizes basket with respect to fryer.

2. Robotic kitchen assistant grabs basket handle with gripper 212. The action for the gripper arises from a first actuator 290 in the gripper assembly 212.

3. Robotic kitchen assistant uses a second pneumatic or actuator 280 to impart momentum into the food particles through the basket.

4. Whether actuator 280 reaches end of stroke or basket hits back of fryer, the rapid acceleration/deceleration helps agitate the food in the basket to prevent from clumping together.

5. In embodiments, the robotic kitchen assistant uses sensors to evaluate the effectiveness of the agitation, e.g., whether food items were broken up. This could be carried out in various ways such as, for example, using a trained Neural Network in a similar fashion to the way the food type is classified, mentioned above.

The agitator 280 provides sufficient force to move food in the basket. However, in embodiments, dampening effects between gripper and robot ensure no large forces are imparted to the robot that could damage its mechanical components. Dampening can be accomplished in a number of ways such as, for example, by adding a dampening material in between the gripper and the arm. The dampening material acts as a shock absorber or cushion. The forces can also be adjusted by balancing deceleration to allow the food to be shaken but not enough to damage the robot. In embodiments using pneumatic actuators, the forces are adjusted by tuning the air pressure.

In another embodiment, one actuator is employed to both grab the handle or kitchen utensil, and to impart momentum into the food particles through the basket.

Latching

The systems described herein may be temporarily secured or mounted to the floor of the kitchen using a wide range of techniques including but not limited to: bolts with nuts or hand-tightenable fasteners, tongue and groove or dove-tail type mating features, ground mounted rails including brakes and locks to secure the robotic kitchen assistant in the desired position, floor mounted lathe or Longworth chuck to grip the stand of the robot, ground-mounted dogleg grooves to guide a peg on the robot stand into a secured releasable position, an enlarged or weighted ballast cabinet, spring-loaded BNC-like connectors.

Wheels, rollers, and other means to move the robotic kitchen assistant may be incorporated with any of the above latching configurations except where exclusive of one another.

The robotic kitchen assistant may be lifted using hydraulic jacks and hoists, cams, and wedges. Springs and other means to assist lifting the robotic kitchen assistant may be incorporated with any of the above latching configurations except where exclusive of one another.

Figure 13:
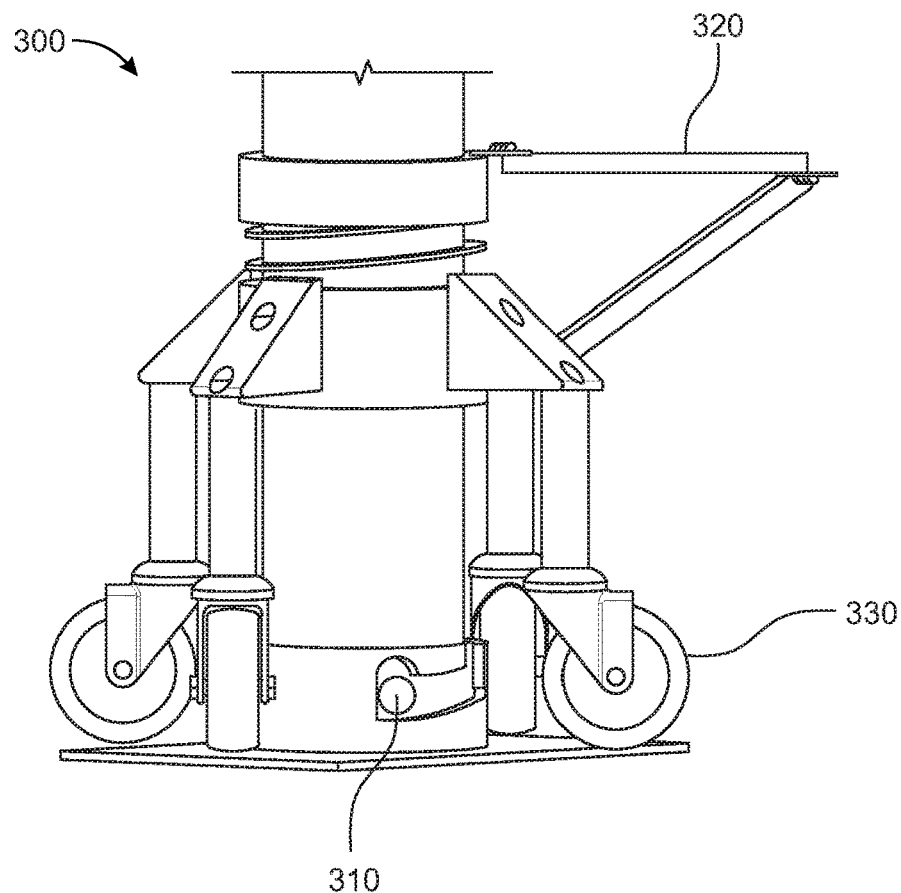
FIG. 13 is a perspective view of a portion of a latching assembly comprising a dog-leg slot and rollers in accordance with an embodiment of the invention.

With reference to FIG. 13, a BNC-type latching assembly 300 is shown including a dogleg slot 310, a lever 320, and rollers 330.

Figure 14:
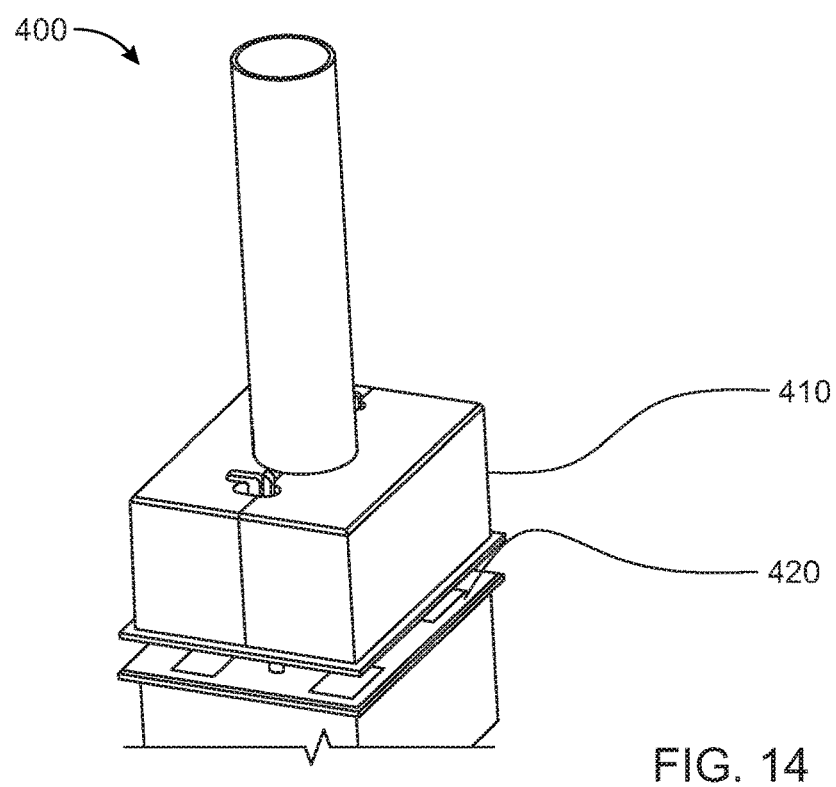
FIG. 14 is a perspective view of a latching assembly including an enclosure in accordance with another embodiment of the invention.
Figure 15A:
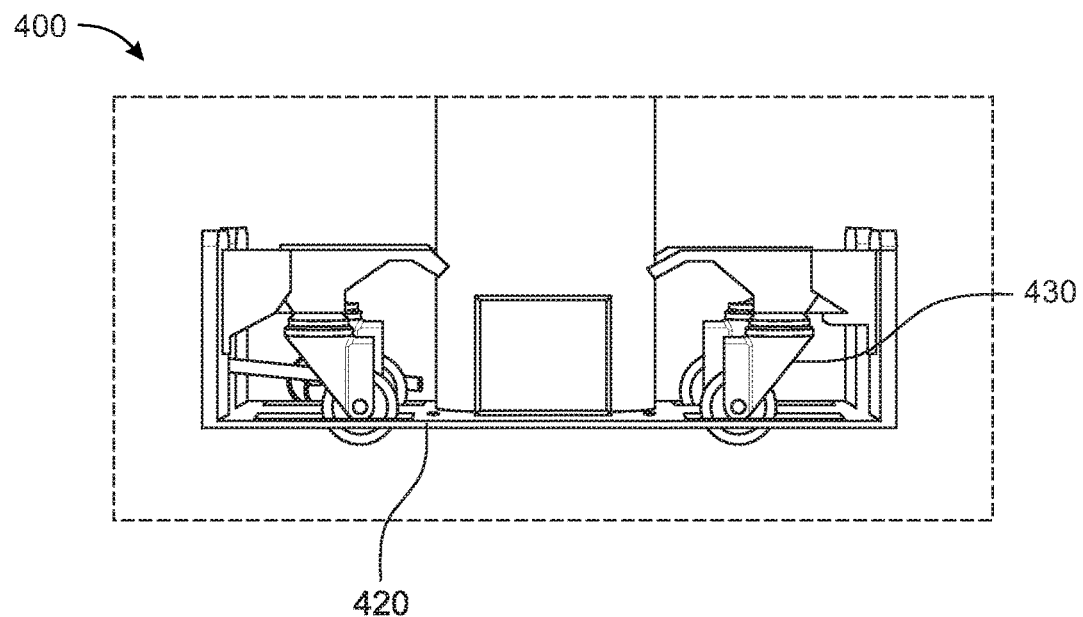
FIGS. 15A-15B are side and top views respectively of the latching assembly shown in FIG. 14.
Figure 15B:
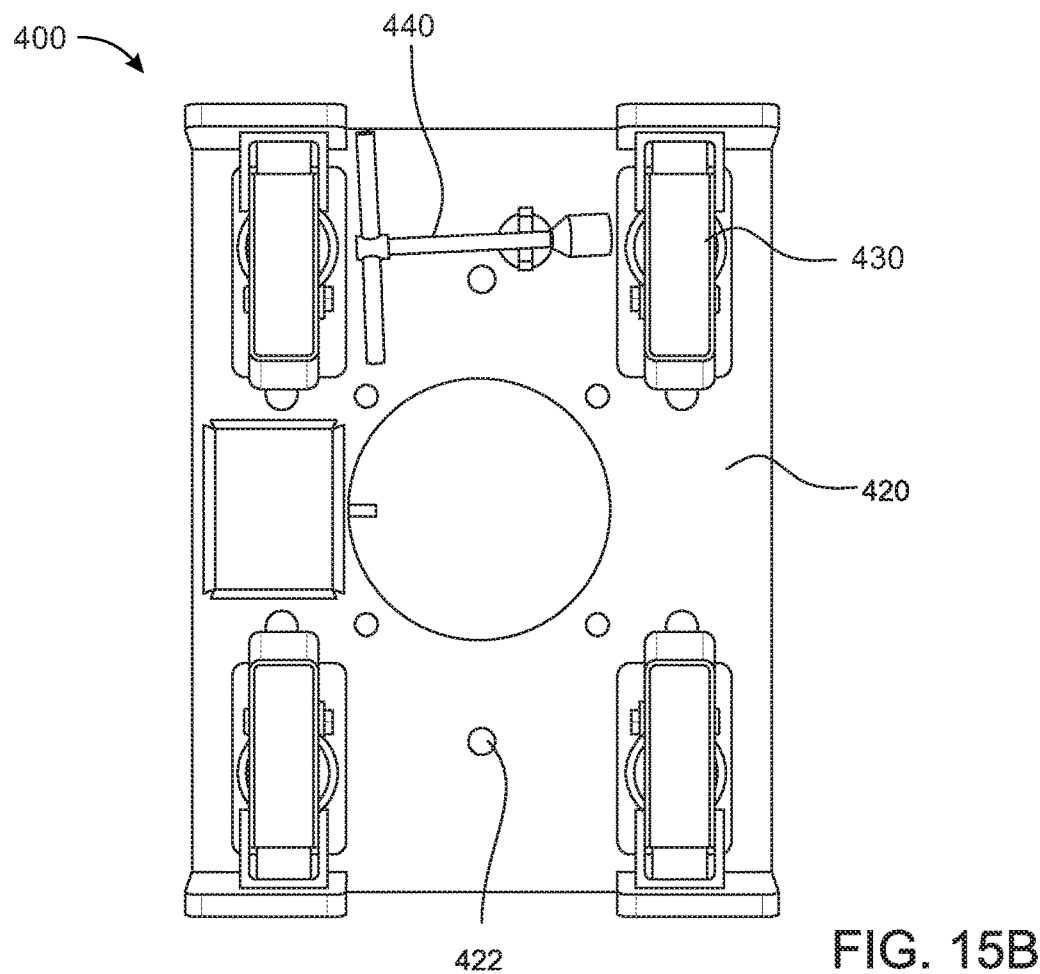

With reference to FIGS. 14, 15A-15B, a ballast-type latching assembly 400 is shown including an enclosure 410, base plate 420, and rollers 430. The stand plate 420 is shown including caster wheels 430 to move the robot and four latches for easy removal.

Not shown, holes are drilled in the ground. Anchors are installed in the holes. The robot is aligned to match the holes in the plate 420 with the holes in the ground. Using the T-bolt wrench 440, the bolts are tightened. This design has the advantage of being moveable, and not leaving a foot print to trip on when moved, and is weighted down to minimize vibrations.

In the embodiment shown in FIGS. 15A-15B, six bolt holes 422 in the base plate 420 are arranged in a circle. However, the arrangement and number of the bolt holes may vary. The invention is not limited to any particular design except where such structure is recited in any appended claims.

VI. Fryer Debris Removal

In embodiments described herein, the robotic kitchen assistant is operable to skim, remove, and dispose the food debris from the fryer.

Figure 16:
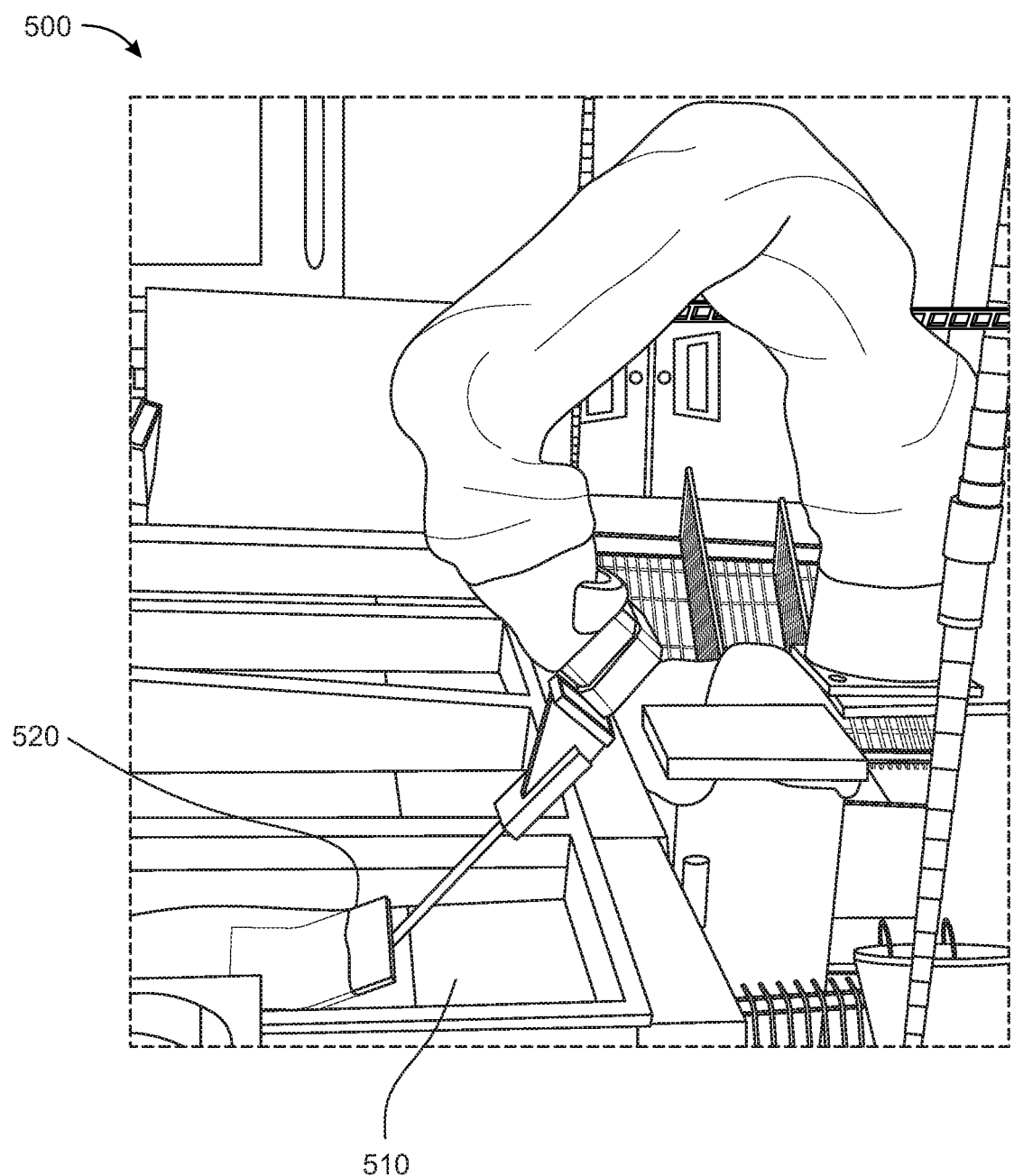
FIG. 16 is a perspective view of a skimmer collecting food debris from a fryer.
Figure 17:
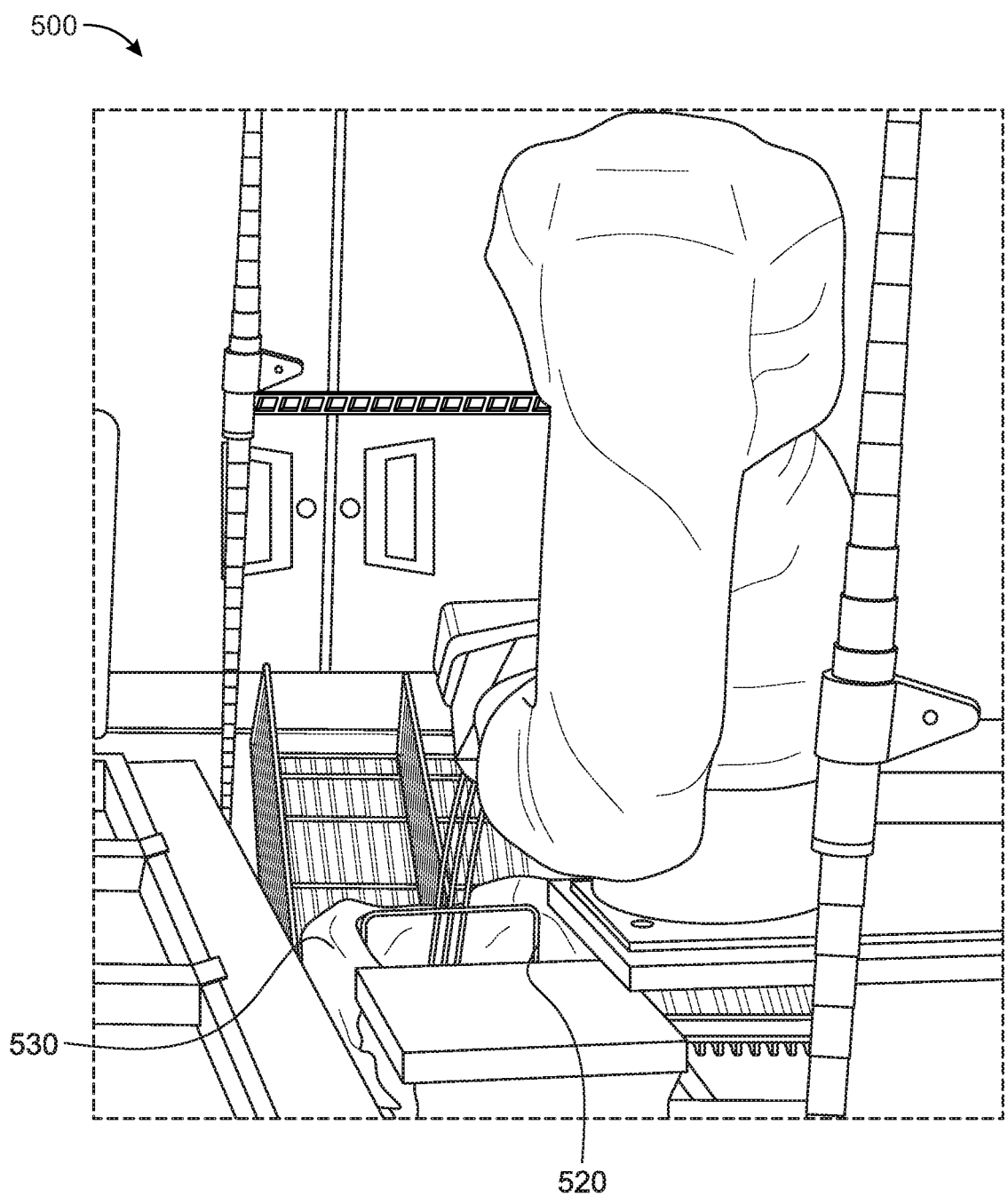
FIG. 17 is a perspective view of the skimmer shown in FIG. 16 dumping the food debris from the skimmer into a waste receptacle in accordance with an embodiment of the invention.

With reference to FIGS. 16-17, for example, the robotic kitchen assistant is programmed to skim the fryer 510 with the skimmer 520, insert the skimmer into a trash can 530, and agitate the skimmer while the skimmer is within the trash can to detach the food debris from the skimmer. In embodiments, an agitator piston, as described above in connection with the gripper, is employed to cause actuation of the skimmer.

Figure 18:
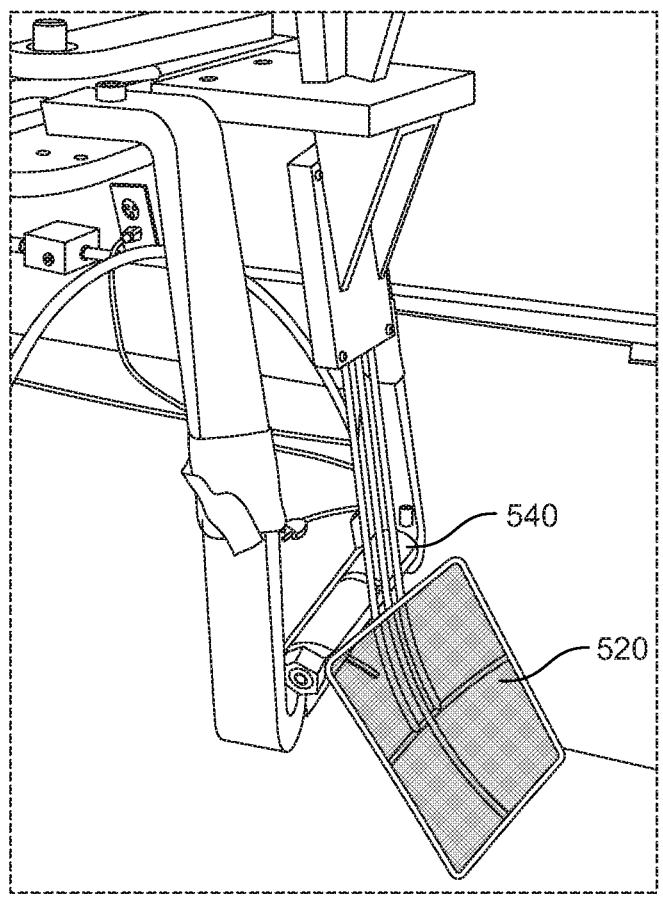
FIG. 18 is a perspective view of a fryer skimmer and a food debris remover.

In addition to that described above, or alternatively, food debris may be removed by the skimmer 520 by blowing a gas across the screen. With reference to FIG. 18, for example, food debris is removed from the skimmer 520 by blowing air through the skimmer using a narrow footprint of air at high velocity. In the embodiment shown in FIG. 18, a 7" air knife 540 is shown aimed at the skimmer.

Figure 19:
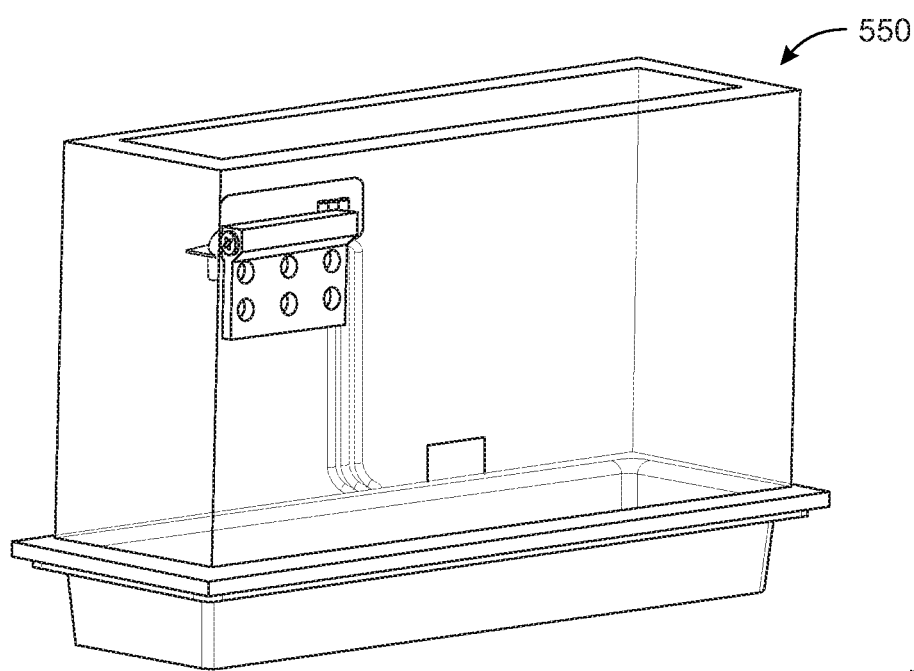
FIG. 19 is a perspective view of a self-contained food debris remover.

In embodiments, and with reference to FIG. 19, the air knife or fan is incorporated into an enclosure 550 to contain food debris removed from the skimmer (not shown).

Sill other techniques may be employed by the robotic kitchen assistant to automatically remove debris from the fryer including rapidly contacting the rim of a trash receptacle with the skimmer, or brushing the skimmer with a tool.

The invention claimed is:

1. A robotic kitchen assistant for carrying out a food preparation step comprises:
    a robotic arm;
    a utensil and a utensil adapter assembly removably mounted to the utensil; and
    a robotic arm adapter having a proximal end coupled to the robotic arm and a distal portion adapted to releasably engage the utensil adapter assembly;
    wherein the utensil adapter assembly comprises a clamp to engage the utensil, a target feature to be captured by the distal portion of the robotic arm adapter, and a target marker mount spaced from the target feature by an elongate body and adapted to hold a computer vision marker.

2. The robotic kitchen assistant of claim 1, wherein the robotic arm adapter comprises opposing movable gripping members having a first open configuration when the gripping members are separated, and a second closed configuration when the gripping members are urged towards one another.

3. The robotic kitchen assistant of claim 2, wherein the opposing gripping members define a capture region sized to engage the target feature of the utensil adapter assembly when the gripping members are in the second closed configuration.

4. The robotic kitchen assistant of claim 3, wherein the utensil is a fryer basket, and the utensil adapter assembly is secured to a handle portion of the fryer basket.

5. The robotic kitchen assistant of claim 3, wherein the target feature of the utensil adapter assembly comprises a three-dimensional shape.

6. The robotic kitchen assistant of claim 5, wherein the target feature is selected from the group consisting of a diamond, sphere, hourglass, and bulb.

7. The robotic kitchen assistant of claim 6, wherein each of gripping members comprise a plurality of teeth.

8. The robotic kitchen assistant of claim 7, wherein the utensil adapter assembly further comprises a recessed region for the teeth to be guided into when the gripping members are closing onto the target feature.

9. The robotic kitchen assistant of claim 8, wherein the recessed region is selected from a narrow region of an hour glass shape, a cutout of a cylinder, a cutout of a cube, or a clamping plane joining two enlarged three-dimensional shapes.

10. The robotic kitchen assistant of claim 3, further comprising a computer operable to instruct the robotic arm and gripping members to: locate the target feature; move the gripping members to the target feature; grasp the target feature; move the utensil; and release the utensil.

11. An automated robotic kitchen system for carrying out a food preparation step using a utensil comprising:
    a robotic arm comprising a distal portion;
    a gripper assembly coupled to the distal portion for securely grasping a target removably fastened to the utensil;
    a utensil adapter assembly comprising the target, a clamping assembly for clamping to the utensil, and a marker mount for holding a computer vision marker coupled to the target by an extended body member thereby spacing a computer vision marker from the target;
    at least one sensor or camera;
    a processor operable to instruct the robotic arm and gripper assembly based on input from the at least one sensor or camera to:
        locate the target;
        move the gripper assembly to the target;
        grasp the target;
        move the utensil; and
        release the utensil.

12. The automated robotic kitchen system of claim 11, wherein the target is three dimensional.

13. The automated robotic kitchen system of claim 12, wherein the target comprises an upper portion and a lower portion separated by a lower profile section for the gripper assembly to clamp.

14. The automated robotic kitchen system of claim 13, wherein the upper portion is diamond-shaped.

15. The automated robotic kitchen system of claim 14, wherein the gripper assembly comprises a first and second jaw, and wherein each of the first jaw and second jaw has a plurality of teeth.

16. The automated robotic kitchen system of claim 15, wherein the target includes a plurality of angled surfaces that guide each of the teeth towards the lower profile section when the jaws are closing.

17. The automated robotic kitchen system of claim 11, wherein the utensil is a fryer basket.

18. The automated robotic kitchen system of claim 11, further comprising an agitator assembly arranged between the gripper assembly and the distal portion of the robotic arm and wherein the agitator assembly is operable to shake the gripper assembly without substantially shaking the robotic arm.

\* \* \* \* \*